(12) United States Patent
Van Camp et al.

(10) Patent No.: US 7,698,242 B2
(45) Date of Patent: Apr. 13, 2010

(54) SYSTEMS AND METHODS TO MAINTAIN PROCESS CONTROL SYSTEMS USING INFORMATION RETRIEVED FROM A DATABASE STORING GENERAL-TYPE INFORMATION AND SPECIFIC-TYPE INFORMATION

(75) Inventors: Kim O. Van Camp, Georgetown, TX (US); Trevor Duncan Schleiss, Austin, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 729 days.

(21) Appl. No.: 11/465,036

(22) Filed: Aug. 16, 2006

(65) Prior Publication Data

US 2008/0046104 A1    Feb. 21, 2008

(51) Int. Cl.
*G06N 5/00*   (2006.01)
*G06F 19/00*  (2006.01)

(52) U.S. Cl. .................................... 706/45; 700/108
(58) Field of Classification Search ............... 706/45; 700/108

See application file for complete search history.

(56) References Cited

U.S. PATENT DOCUMENTS

| | | | |
|---|---|---|---|
| 6,571,285 B1 | 5/2003 | Groath et al. | |
| 6,633,782 B1 * | 10/2003 | Schleiss et al. | 700/26 |
| 6,801,920 B1 | 10/2004 | Wischinski | |
| 6,813,532 B2 | 11/2004 | Eryurek et al. | |
| 6,965,806 B2 | 11/2005 | Eryurek et al. | |
| 6,985,779 B2 | 1/2006 | Hsiung et al. | |
| 7,020,875 B2 | 3/2006 | Zweifel et al. | |
| 7,130,701 B1 | 10/2006 | Wischinski | |
| 7,203,560 B1 | 4/2007 | Wylie et al. | |
| 7,239,977 B2 | 7/2007 | Fantana et al. | |
| 7,328,078 B2 | 2/2008 | Sanford et al. | |
| 7,346,404 B2 | 3/2008 | Eryurek et al. | |
| 2002/0046221 A1 | 4/2002 | Louis Wallace et al. | |

(Continued)

FOREIGN PATENT DOCUMENTS

WO    WO 02/079884 A1    10/2002

(Continued)

OTHER PUBLICATIONS

"Search Report Under Section 17(5)," issued by the United Kingdom Intellectual Property Office on Nov. 8, 2007, in connection with United Kingdom patent application No. GB0715422.2, (3 pages).

*Primary Examiner*—David R Vincent
*Assistant Examiner*—Li-Wu Chang
(74) *Attorney, Agent, or Firm*—Hanley, Flight and Zimmerman, LLC

(57) ABSTRACT

Example systems and methods to maintain process control systems are disclosed. A disclosed example method involves retrieving first information and determining whether the first information is associated with a process control system. If the first information is associated with the process control system, second information is generated to indicate that the first information is associated with the process control system. It is also determined whether the first information is associated with a particular node of the process control system. If the first information is associated with the particular node of the process control system, third information is generated to indicate that the first information is associated with the particular node.

36 Claims, 26 Drawing Sheets

U.S. PATENT DOCUMENTS

| | | |
|---|---|---|
| 2002/0163427 A1 | 11/2002 | Eryurek et al. |
| 2002/0174264 A1 | 11/2002 | Fuller et al. |
| 2004/0153412 A1 | 8/2004 | Fischer et al. |
| 2004/0186927 A1 | 9/2004 | Eryurek et al. |
| 2004/0213384 A1 | 10/2004 | Alles et al. |
| 2005/0010323 A1 | 1/2005 | Cocciadiferro et al. |
| 2005/0033866 A1 | 2/2005 | Besson et al. |
| 2006/0101457 A1 | 5/2006 | Zweifel et al. |
| 2007/0143450 A1 | 6/2007 | Kruse et al. |
| 2007/0244584 A1 | 10/2007 | John et al. |

FOREIGN PATENT DOCUMENTS

| | | |
|---|---|---|
| WO | WO03075206 | 9/2003 |

* cited by examiner

FIG. 6

Actionable KBAs

System Nodes matching KBA: NA-0300-1011

| Node 1104 | Type 1102 | Model 1106 | Serial Number 1108 | Software Revision 1110 | Hardware Revision 1112 |
|---|---|---|---|---|---|
| 86CTL001-C01 | I/O Module | AI Card, 8 Ch., 4-20mA, HART, Redundant | L023600589 | 1.26 | 6.7 |
| 86CTL001-C02 | I/O Module | AI Card, 8 Ch., 4-20mA, HART, Redundant | L023600601 | 1.26 | 6.7 |
| 86CTL001-C03 | I/O Module | AI Card, 8 Ch., 4-20mA, HART, Redundant | L023600464 | 1.26 | 6.7 |
| 86CTL001-C04 | I/O Module | AI Card, 8 Ch., 4-20mA, HART, Redundant | L023600761 | 1.26 | 6.7 |

Copy to Clipboard

SYSTEMS AND METHODS TO MAINTAIN PROCESS CONTROL SYSTEMS USING INFORMATION RETRIEVED FROM A DATABASE STORING GENERAL-TYPE INFORMATION AND SPECIFIC-TYPE INFORMATION

FIELD OF THE DISCLOSURE

The present disclosure relates generally to process control systems and, more particularly, to systems and methods to maintain process control systems.

BACKGROUND

Process control systems, like those used in chemical, petroleum or other processes, typically include one or more centralized process controllers communicatively coupled to at least one host or operator workstation and to one or more field devices via analog, digital or combined analog/digital buses. The field devices, which may be, for example, device controllers, valves, valve positioners, switches and transmitters (e.g., temperature, pressure and flow rate sensors), perform functions within the process control system such as opening or closing valves and measuring process parameters. A central process controller receives signals indicative of process measurements made by the field devices and/or other information pertaining to the field devices, uses this information to implement a control routine and then generates control signals that are sent over the buses or other communication lines to the field devices to control the operation of the process control system.

A company may operate several process plants, each having one or more process control systems having different configurations. Performing hardware and software maintenance on such systems can be an arduous task. Because the process control systems may be located at different plant sites at different geographical locations, system engineers may be subject to frequent travel between each plant site. Alternatively, each plant site may have system engineers responsible for maintaining the hardware and software associated with the components of a process control system. In any case, maintaining a company's process control systems often involves different maintenance procedures.

SUMMARY

Example systems and methods to maintain process control systems are described. In accordance with an example, a method involves retrieving first information and determining whether the first information is associated with a process control system. If the first information is associated with the process control system, second information is generated indicating the first information is associated with the process control system. It is then determined whether the first information is associated with a particular node of the process control system. If the first information is associated with the particular node of the process control system, third information is generated indicating the first information is associated with the particular node.

In accordance with another example, an apparatus includes an interface configured to retrieve first information and a comparator configured to determine whether the first information is associated with the process control system and whether the first information is associated with a particular node of the process control system. The example apparatus also includes a match indicator configured to generate second information indicating the first information is associated with the process control system if the first information is associated with the process control system. The match indicator is further configured to generate third information indicating the first information is associated with the particular node if the first information is associated with the particular node.

In accordance with yet another example, a method involves rendering a first display area via a graphical user interface to display control system identifiers for a plurality of control systems. A second display area is then rendered via the graphical user interface to display a plurality of information modules associated with a selected one of the control system identifiers. A data structure associated with the selected one of the control system identifiers is then accessed to retrieve maintenance information associated with the control system corresponding to the selected one of the control system identifiers. The retrieved maintenance information is displayed via at least some of the information modules.

In accordance with a further example, a method involves obtaining first and second maintenance notifications associated with control systems. The first and second maintenance notifications are compared with first information of a first plurality of device nodes of a first control system. A first quantity of the first plurality of device nodes associated with the first maintenance notification is then displayed in a first display area of a graphical user interface based on the comparison. A second quantity of the first plurality of device nodes associated with the second maintenance notification is displayed in a second display area of the graphical user interface based on the comparison.

BRIEF DESCRIPTION OF THE DRAWINGS

FIG. 6 is a graphical user interface of an example administration screen that may be used to implement an administrator-accessible listing of user name entries that can be selected to view and/or modify user records.

FIG. 11 is a graphical user interface of an example actionable KBA detailed information screen used to list a plurality of nodes associated with a KBA listed in the example actionable KBA's summary screen of FIG. 10.

FIG. 16 is a graphical user interface of an example lifecycle status screen that may be used to display associations between lifecycle stages and devices or portions of the process control systems of FIG. 1.

FIG. 17 is a graphical user interface of an example service expiration screen that may be used to display expiration dates of support and warranty services associated with portions of the process control systems of FIG. 1.

FIG. 19 is a graphical user interface of an example system device details screen that may be used to display a listing of details associated with the equipment used to implement the process control systems of FIG. 1.

FIG. 20 is a graphical user interface of an example device-level detailed information screen that may be used to display detailed information associated with a particular device or apparatus within the process control systems of FIG. 1.

FIG. 21 is a graphical user interface of an example system interfaces screen that may be used to display the interconnection interfaces used to implement the process control systems of FIG. 1.

DETAILED DESCRIPTION

Figure 1:
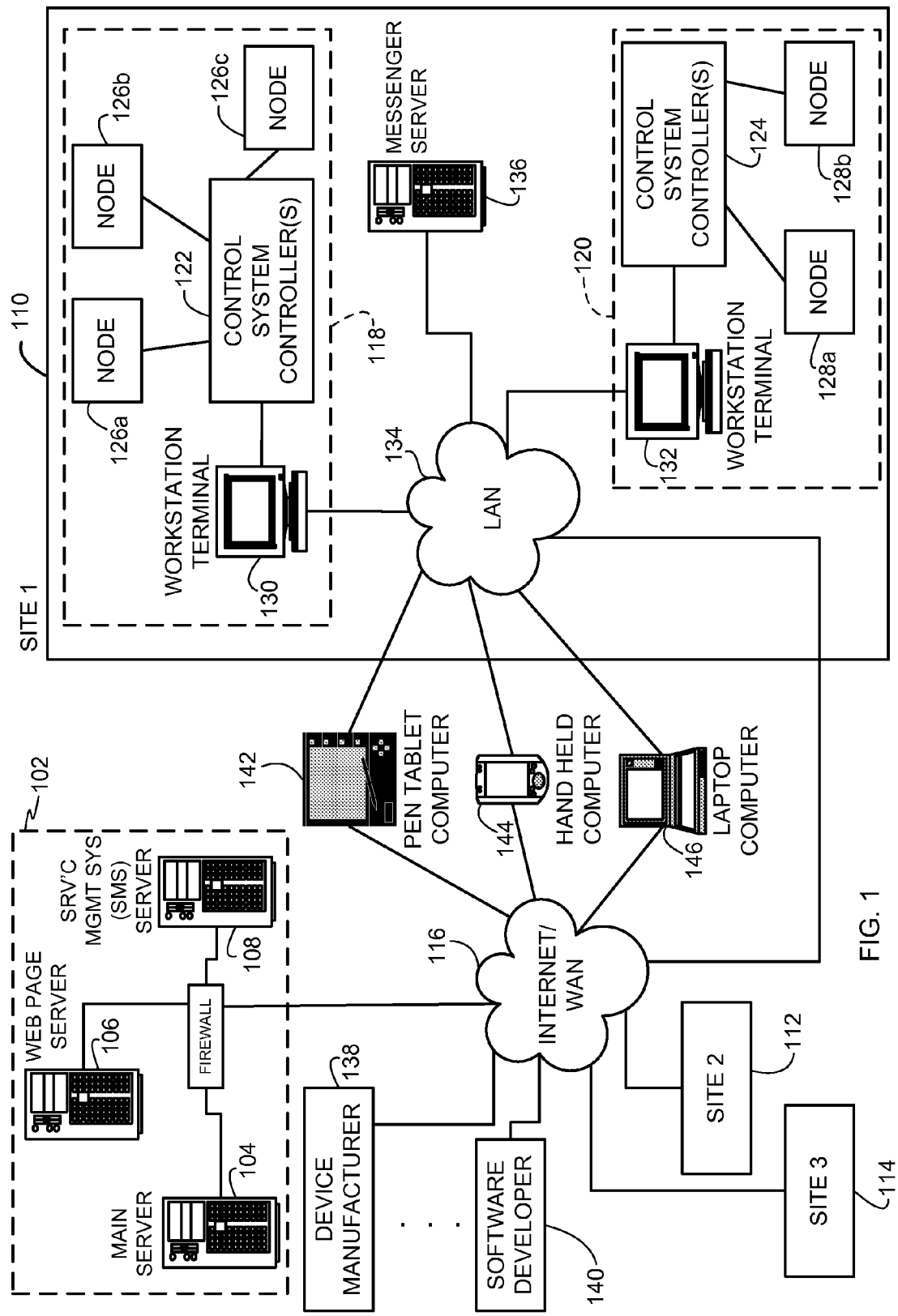
FIG. 1 is a block diagram illustrating an example online maintenance system communicatively coupled to a plurality of process control systems.

Although the following describes example systems including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the following describes example systems, persons of ordinary skill in the art will readily appreciate that the examples provided are not the only way to implement such systems.

Unlike known techniques for maintaining process control systems that involve using manual maintenance techniques to prevent or correct system malfunctions, the example methods and systems described herein may be used to implement an online maintenance system that monitors remotely located process control systems and associated equipment and generates information associated with preventative and/or corrective maintenance. The example methods and systems described herein involve using an example online maintenance system that is communicatively coupled to one or more remotely located process control systems and configured to monitor various aspects of the process control system to generate preventative and/or corrective maintenance information. For example, the example online maintenance system may be implemented using one or more maintenance servers at a central facility executing machine accessible instructions that cause the maintenance servers to communicate via the Internet or other communication network (e.g., a local area network ("LAN"), a wireless LAN ("WLAN"), a wide area network ("WAN"), etc.) with one or more remotely located process control system servers and that cause the maintenance servers to obtain process control system information (e.g., performance information, operating information, etc.) from the process control system servers.

The example online maintenance system may analyze the process control system information to determine whether any preventative maintenance or corrective maintenance is available for any portion of the one or more process control systems. The process control system information may be indicative of various types of operating conditions of each process control system including, for example, the software and/or firmware executed by the equipment in each process control system, any equipment failures within the systems, operating efficiencies, part numbers and manufacturers of equipment used to implement the systems, and/or many other types of operating conditions. To detect whether maintenance procedures should be performed, in some example implementations, the example online maintenance system may compare at least some of the process control system information with knowledgebase articles ("KBA's") (e.g., maintenance database entries) that describe issues (e.g., software bugs, equipment failures, operating anomalies, etc.) and suggested workarounds, fixes, or other maintenance procedures associated with overcoming or remedying the issues.

The example online maintenance system may be implemented using a web-based interface such as, for example, a web-based portal. In some example implementations, users may access the example online maintenance systems via virtually any computer system having network access and capable of rendering web pages. In this manner, unlike with traditional techniques used to maintain process control systems, users may access maintenance information and perform maintenance procedures when located remotely from a process control system (e.g., not within the plant or off the process control system premises).

The example online maintenance system may also be implemented to provide a plurality of other features. For example, the example online maintenance system may be configured to send alerts via e-mail, pager, mobile phone, landline phone, really simple syndication ("RSS"), etc. to users (e.g., system operators, system engineers, maintenance engineers, etc.) if one or more particular conditions are met (e.g., a failure condition, a change in software or hardware, availability of firmware updates or software upgrades, etc.). The example online maintenance system may also generate various maintenance reports, monitor the lifecycle status of portions of the process control systems, organize and track information (e.g., expiration dates) associated with product warranty and support services, store and display status of open maintenance tickets or maintenance calls, and other features described below.

Now turning to FIG. 1, an example online maintenance system 102 includes a main server 104, a web page server 106, and a service management system ("SMS") server 108. In alternative example implementations, the example online maintenance system 102 may include fewer or more servers than depicted in FIG. 1 to implement the example features, services, and capabilities of the example online maintenance system 102 described herein.

In the illustrated example, the main server 104 is configured to receive registration and/or configuration information associated with process control systems (e.g., example process control systems 118 and 120) monitored by the example online maintenance system 102. The registration and/or configuration information may include field device information, software information, firmware information, operational status information, maintenance information, lifecycle information, etc. associated with hardware, software, and/or firmware used to implement the components and devices of monitored process control systems. The main server 104 may receive the registration and/or configuration information during an enrollment process of a process control system (e.g., when a process control system is brought online for the first time to be monitored by the example online maintenance system 102). In addition, the main server 104 may receive new and/or updated registration and/or configuration information periodically and/or aperiodically after an enrollment process to ensure that the example online maintenance system 102 has the latest and up-to-date information corresponding to monitored process control systems.

The main server 104 is also configured to monitor process control systems. For example, the main server 104 may be provided with software that, when executed, causes the main server 104 to monitor field devices and/or other components or devices of monitored process control systems based on, for example, the registration and/or configuration information received from the process control systems.

In the illustrated example, the web page server 106 is configured to create and serve web pages to operators of monitored process control systems. In the illustrated example, the web page server 106 serves web pages including the graphical user interfaces ("GUI's") described below in connection with FIGS. 2-25. The web pages may be used by operators to provide information to and retrieve information from the example online maintenance system 102. For example, the web pages served by the web page server 106 may be used to register a process control system with the example online maintenance system 102 and to provide registration and/or configuration information to the main server 104.

In the illustrated example, the main server 104 and the web page server 106 are implemented separately to enable taking the web page server 106 offline without compromising the monitoring processes and registration/configuration information receiving processes performed by the main server 104. For example, the web page server 106 may be taken offline to perform maintenance (e.g., to add or upgrade web page interfaces, update security software, etc.) while the main server 104 continues to monitor process control systems.

In the illustrated example, the SMS server 108 is configured to store and process the registration/configuration information corresponding to each process control system monitored by the example online maintenance system 102. For example, the SMS server 108 may include and/or be communicatively coupled to one or more data structures (e.g., databases) that store the registration/configuration information. The SMS server 108 may also be configured to store knowledgebase articles ("KBA's") (e.g., maintenance database entries or other database entries that include maintenance information or other information about process systems and/or parts thereof) that describe issues (e.g., software bugs, equipment failures, operating anomalies, etc.) associated with different components or devices of process control systems. Typically, the KBA's also include suggested workarounds, fixes, or other maintenance procedures associated with overcoming or remedying the indicated issues. In the illustrated example, KBA's can be general type KBA's that are related to a process control system generally or KBA's can be specific device type KBA's that are related to specific parts (e.g., field devices, workstations, controllers, etc.) or portions (e.g., subsystems) of a process control system.

In the illustrated example, the SMS server 108 is configured to perform a KBA matching process described below in connection with flow diagrams depicted in FIGS. 28-30. In general, the KBA matching process compares information stored in a KBA (e.g., identification information, device type information, or other criteria described below in connection with the example actionable KBA detailed information screen 1100 of FIG. 11) to the registration/configuration information to determine which KBA's are applicable or relevant to which monitored process control systems.

The example online maintenance system 102 is communicatively coupled to a first site 110, a second site 112, and a third site 114 via the Internet (or other wide area network ("WAN")) 116. A WAN may be implemented using, for example, a telephone line, a digital subscriber line ("DSL"), an integrated services digital network ("ISDN"), a broadband cable system, a broadband alternating current ("AC") system, a satellite communication system, etc.

The sites 110, 112, and 114 may be part of a single enterprise (e.g., operated by the same business entity, company, corporation, etc.) and may include manufacturing sites, distribution sites, refinery sites, paper mills, or any other type of industrial or business site having operations associated with process control systems. While the first site 110 is illustrated in relatively more detail than the second and third sites 112 and 114, one or both of the second and third sites 112 and 114 may be implemented using configurations substantially similar or identical to (or different from) the illustrated configuration of the first site 110. In any case, the sites 110, 112, and 114 include one or more process control systems that are monitored and maintained using the example online maintenance system 102.

In the illustrated example, the first site 110 includes first and second distributed process control systems 118 and 120. The process control systems 118 and 120 may be used to perform substantially the same or different operations. For example, one of the process control systems 118 and 120 may be used to handle process fluids while the other may be used to operate a product manufacturing process. Of course, the process control systems 118 and 120 may be used to perform operations performed with any other type of process.

The first and second process control systems 118 and 120 include respective controllers 122 and 124, which are communicatively coupled to respective nodes 126a-c and 128a-b. At least some of the nodes 126a-c and 128a-b may include field devices such as, for example, device controllers, valves, valve positioners, switches, and/or transmitters (e.g., temperature, pressure, and flow rate sensors). The controllers 122 and 124 may be used to communicate configuration and control information to the nodes 126a-c and 128a-b and receive information from the nodes 126a-c and 128a-b including, for example, configuration information, control information, status information, measurement information, analysis information, etc. Although not shown, the process control systems 118 and 120 may include other process control system equipment including, for example, I/O modules, redundant equipment to provide fault tolerant features, wireless base stations for communicating with wireless field devices, etc., any of which may be represented by one of the nodes 126a-c and 128a-b.

The first and second process control systems 118 and 120 also include respective first and second workstation terminals 130 and 132, each of which is communicatively coupled to a respective one of the controllers 122 and 124. The workstation terminals 130 and 132 are communicatively coupled to a local area network ("LAN") 134, which is communicatively coupled to the Internet 116, and enables the process control systems 118 and 120 to communicate with the example online maintenance system 102. The LAN 134 may be implemented using a wired network (e.g., Ethernet, Token Ring, IEEE 1394, universal serial bus ("USB"), etc.) or a wireless network (e.g., IEEE 802.11 (Wi-Fi®), Bluetooth®, 900 MHz, etc.).

In some example implementations, to substantially reduce or eliminate compromising the security (e.g., data security, network security, etc.), integrity, etc. of the process control systems 118 and 120, some users may elect to not communicatively couple the process control systems 118 and 120 to the LAN 134 and/or may elect to restrict human access to the process control systems 118 and 120. In such a configuration, to communicate information about the process control systems 118 and 120 to the example online maintenance system 102, authorized users with physical access to one or both of the workstation terminals 130 and 132 may initiate processes in the workstation terminals 130 and 132 to collect and organize saved data (e.g., process control system information) intended for the example online maintenance system 102 using encrypted extensible markup language ("XML") files. The authorized user can then store the encrypted XML files on a portable machine readable medium (e.g., a CD-ROM, a USB memory stick, a magnetic disk, etc.) and physically transport the encrypted XML files from the workstation terminals 130 and 132 to a processor system (e.g., the pen tablet computer 142, the hand held computer 144, the laptop computer 146, or another workstation) communicatively coupled to the Internet 116. The user can then upload the encrypted XML files to the main server 104. The user may periodically or aperiodically repeat the process to update the process control system information stored at the example online maintenance system 102. This example implementation enables the example online maintenance system 102 to provide its services and respond in a timely fashion to changes in the process control systems 118 and 120. As a result, users are able to obtain the benefits of the services provided by the example online maintenance system 102 while ensuring information integrity and security of the process control systems 118 and 120.

The workstation terminals 130 and 132 may store application programs including machine accessible instructions that, when executed, cause the workstation terminals 130 and 132 to exchange information with the controllers 122 and 124 and the example online maintenance system 102. The workstation terminals 130 and 132 may communicate with the controllers 122 and 124 to communicate configuration information and control information to field devices at the nodes 126a-c and 128a-b and receive measurement information, analysis information, operating condition information, status information, and other maintenance information (e.g., software version, hardware version, serial number, manufacturer, date of installation, last date of maintenance, etc.). The terminals 130 and 132 may communicate at least some of the information received from the controllers 122 and 124 and nodes 126a-c and 128a-b to the example online maintenance system 102. In addition, the terminals 130 and 132 may receive maintenance information from the example online maintenance system 102 that pertains to the controllers 122 and 124, the nodes 126a-c and 128a-b and devices attached thereto, and any other equipment communicatively coupled to the terminals 130 and 132. In this manner, the terminals 130 and 132 may inform users (e.g., an operator, a system engineer, an administrator, etc.) when updates, upgrades, or other maintenance information (e.g., technical documentation, replacement device availabilities, etc.) are available.

The first site 110 also includes a messenger server 136 communicatively coupled to the LAN 134 and configured to communicate with the process control systems 118 and 120. In the illustrated example, the messenger server 136 is configured to generate and/or track alarms and/or events associated with the process control systems 118 and 120. For example, the messenger server 136 may obtain alarms generated by the field device nodes 126a-c and 128a-b, the controllers 122 and 124, and/or the workstation terminals 130 and 132. In some example implementations, any of the equipment used to implement the process control systems 118 and 120 may be configured to generate alarms based on, for example, threshold measurement values, hours of operation, efficiency, or any other type of operating condition. Additionally or alternatively, the messenger server 136 may be configured to generate alarms based on operating condition information obtained from the process control systems 118 and 120. In any case, the messenger server 136 may store and track the status of the alarms in a data structure (e.g., a database) and generate reports based on the alarm information.

In the illustrated example, the messenger server 136 may also generate event information. Events may include, for example, equipment status changes (e.g., enabled, disabled, on/off, equipment error, etc.), operator changes, equipment configuration changes (e.g., new configuration downloaded to a field device). The messenger server 136 may store and track the status of the events in a data structure (e.g., a database) and generate reports based on the stored event information.

The example online maintenance system 102 may access the alarm and event information stored in the messenger server 136 and use the alarm and event information to determine whether maintenance may be required or whether any maintenance information (e.g., product documentation, bug reports, knowledgebase articles, product updates, etc.) may be available for any equipment in the process control systems 118 and 120.

A user may use the first and second workstation terminals 130 and 132 to access information obtained from the controllers 122 and 124, the example online maintenance system 102, and/or the messenger server 136. In an example implementation, the terminals 130 and 132 may execute dedicated client-side software applications that establish network connections with the example online maintenance system 102 to exchange maintenance information with the online maintenance system 102. Alternatively or additionally, the terminals 130 and 132 may execute web browsers to access web pages or web-based applications to access the example online maintenance system 102 and to perform substantially the same or similar operations as with a dedicated client-side software application. In any case, a user may use the dedicated client-side application or the web-based application to view, modify, and manage the maintenance information obtained from the controllers 122 and 124, the example online maintenance system 102, and the messenger server 136.

A user may perform maintenance related work via the terminals 130 and 132. For example, the user may instruct the terminals 130 and 132 and/or the example online maintenance system 102 to update or upgrade particular equipment (e.g., field devices, the controllers 122 and 124, etc.) with received software or firmware updates. Also, the user may view summary and detail information pertaining to open service calls associated with the process control systems 118 and 120. Other information the user may view, modify, and/or manage is described in greater detail below in connection with FIGS. 3-26. In some example implementations, the terminals 130 and 132 may also be configured to view, modify, and/or manage information associated with process control systems in the second and third sites 112 and 114.

The example online maintenance system 102 may obtain maintenance information such as software/firmware updates, replacement device availability, manuals, technical documentation, bug reports, etc. from software vendors and device manufacturers. In the illustrated example, a device manufacturer system 138 and a software vendor system 140 are communicatively coupled to the Internet 116 to provide hardware and software/firmware update information to the example online maintenance system 102. In this manner, the example online maintenance system 102 can select update information pertaining to control systems in each of the sites 110, 112 and 114 and forward the selected information to the respective sites 110, 112, and 114.

The example implementation of FIG. 1 also includes a pen tablet computer 142, a handheld computer 144, and a laptop computer 146, all of which may be communicatively coupled to the Internet 116 and/or the LAN 134 to communicate with the example online maintenance system 102, the process control systems 118 and 120, and the messenger server 136. Users may use one or more of the pen tablet computer 142, the handheld computer 144, the laptop computer 146, or any other computer (e.g., a desktop computer) coupled to the Internet 116 or the LAN 134 and remotely located from the site 110 to access maintenance information associated with the site 110 in a manner substantially similar to that described above in connection with the workstation terminals 130 and 132. For instance, the pen tablet computer 142, the handheld computer 144, and the laptop computer 146 may execute dedicated client-side applications and/or web-based applications (or web pages) to view, modify, and/or manage the maintenance information associated with the process control equipment at any of the sites 110, 112, or 114.

Figure 2:
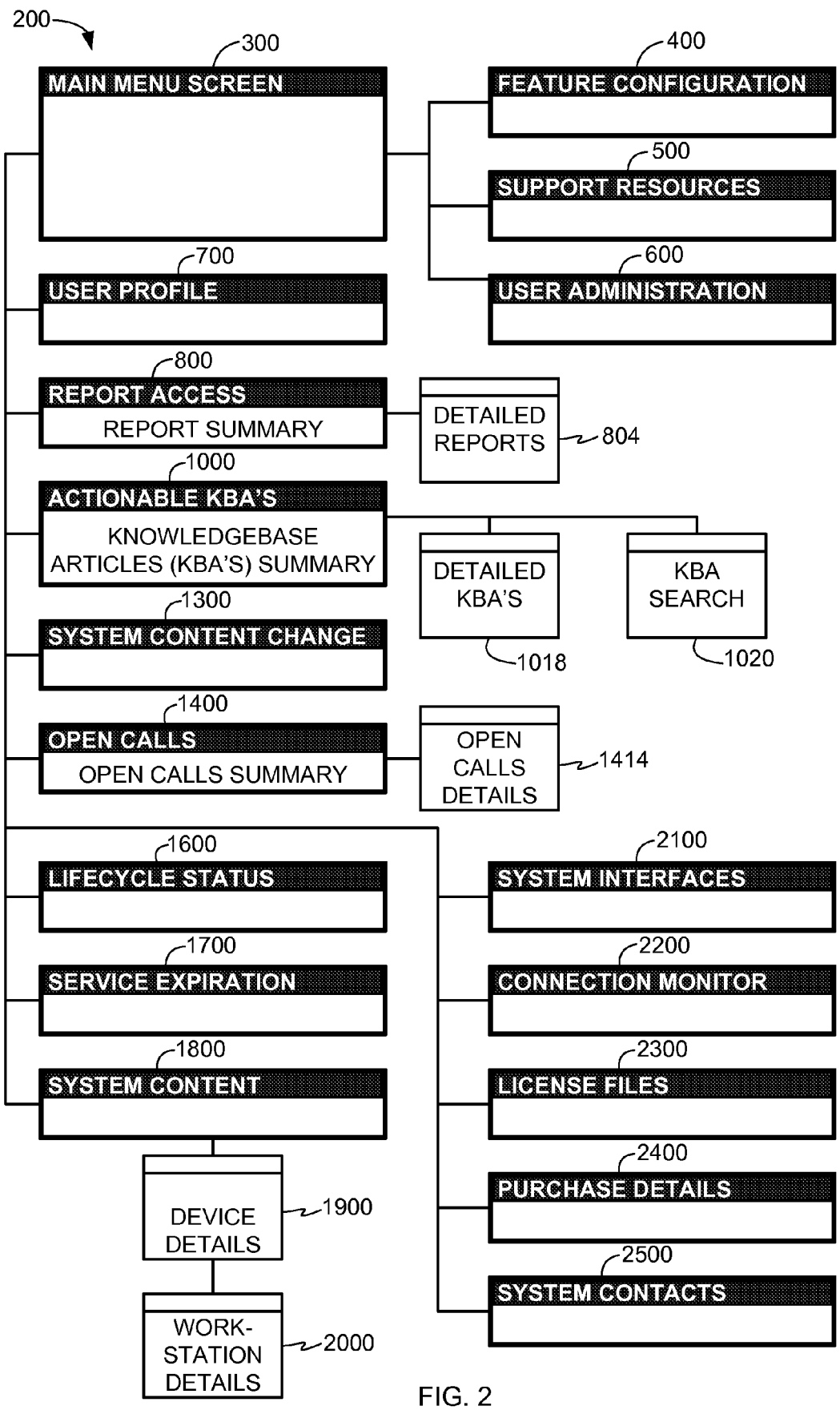
FIG. 2 is an example user interface hierarchy map depicting the relationship between a plurality of graphical user interface screens used to access information associated with the example online maintenance system and the process control systems of FIG. 1.

FIG. 2 is an example user interface hierarchy map 200 depicting the relationship between a plurality of graphical user interface screens used to access maintenance information associated with the example online maintenance system 102 and the process control systems 118 and 120 of FIG. 1. The plurality of graphical user interfaces may be implemented using a dedicated client-side software application that is executed by one or more of the workstation terminals 130 and 132, the pen tablet 142, the handheld computer 144, and/or the laptop 146. Alternatively or additionally, the graphical user interface screens may be rendered by web browsers as web pages or web-based applications. In some example implementations, the graphical user interfaces may be implemented as a portal to access maintenance information and various maintenance features and maintenance services provided by the example online maintenance system 102. Each of the graphical user interfaces is shown in more detail in FIGS. 3-25.

Although the maintenance information and the services provided by the example online maintenance system 102 can be accessed using any type of software program described above, for purposes of simplicity, the example methods and systems are described below in connection with web pages that may be rendered using web browser applications executed by any of the workstation terminals 130 and 132, the pen tablet computer 142, the handheld computer 144, or the laptop computer 146. In the example implementations described herein, the web pages used to provide the example graphical user interface screens described below are served by the web page server 106 of FIG. 1 using active server page ("ASP") technology. In addition, the maintenance information, services, and features provided via the example graphical user interface screens may be retrieved from data structures stored in one or more of the main server 104, the web page server 106, and the SMS server 108 of FIG. 1.

Figure 3:
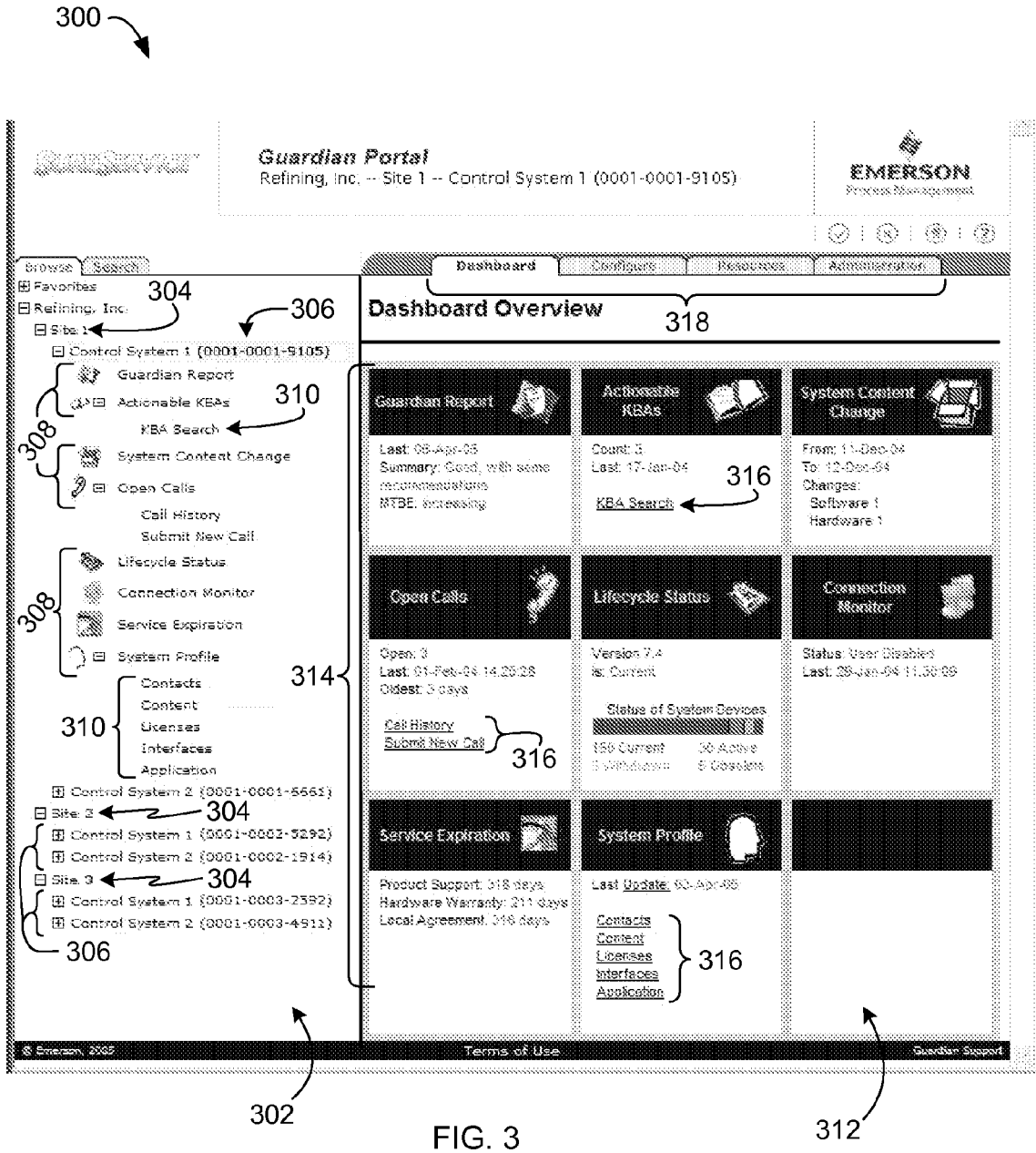
FIG. 3 is a graphical user interface of an example main menu screen that may be used to access services associated with the example online maintenance system of FIG. 1.

The example hierarchy map 200 depicts a main menu screen 300 that can be displayed to a user after logging into a login web page. The main screen 300 is depicted in detail in FIG. 3. In the illustrated example of FIG. 3, the main screen 300 is implemented using a portal type of web page providing links to various maintenance information, maintenance features, and maintenance services provided by the example online maintenance system 102. As shown in FIG. 3, the main menu screen 300 includes an enterprise browse display area 302 used to render a tree arrangement display including site identifiers 304 (e.g., plant site names, plant site identification numbers, etc.) and control system identifiers 306 (e.g., system names, system identification numbers, etc.). In the illustrated example, each of the site identifiers 304 identifies one of the sites 110, 112, and 114 of FIG. 1. Also, each of the control system identifiers 306 identifies one of a plurality of process control systems of FIG. 1 (e.g., the process control systems 118 and 120 of the first site 110 and process control systems in the second and third sites 112 and 114).

A user may access maintenance information, maintenance services, or maintenance features associated with each of the represented process control systems by selecting respective ones of the control system identifiers 306. As shown, selecting the control system identifier 306 pertaining to the control system 118 causes the main screen 300 to display a plurality of selectable maintenance category identifiers 308 (e.g., maintenance feature and maintenance service identifiers). Some of the maintenance category identifiers 308 are further expandable to display selectable maintenance sub-category identifiers 310.

The main menu screen 300 also includes a tile display area 312 adjacent the enterprise browse display area 302. The tile display area 312 includes a plurality of selectable information tiles 314, each of which is associated with one of the maintenance category identifiers 308 depicted in the enterprise browse display area 302. As shown, each of the selectable maintenance category information tiles 314 displays general, summary, or high-level information associated with that information tile 314. For example, each selectable tile 314 may be configured to display a most recent activity, a most urgent activity, general performance associated with a maintenance category, or any other information. In some example implementations, the information displayed in the maintenance category information tiles 314 may be set by a user (e.g., an administrator). In any case, the information displayed in the maintenance category information tiles 314 may be used by a user to quickly see information most pertinent to previously identified interests (e.g., interest in system failures, interest in most recent service call activity, interest in particular performance report, interest in approaching product support/warranty expiration dates, etc.).

Some of the information tiles 314 also include maintenance sub-category hyperlinks 316 that correspond to respective ones of the maintenance sub-category identifiers 310 in the enterprise browse display area 302. To display user interface screens (e.g., some of the user interface screens described below in connection with FIGS. 4-25) associated with the information tiles 314, a user may select the information tile 314 or hyperlink 316 of interest, or the user may select a corresponding one of the selectable maintenance category or sub-category identifiers 308, 310 in the enterprise browse display area 302 to invoke the user interface screens of interest. For purposes of clarity, however, some of the user interface screens described below in connection with FIGS. 4-25 are described as being accessed by selecting one of the information tiles 314 or the hyperlinks 316.

The main menu screen 300 also includes a plurality of tabs 318 that may be used to select screens associated with general configuration and administration of the example online maintenance system 102 (FIG. 1) or other information such as, for example, support resources for the example online maintenance system 102.

Selecting the maintenance category identifiers 308, the maintenance sub-category identifiers 310, the maintenance category information tiles 314, or the tabs 318 causes the web page server 106 (FIG. 1) to transmit information associated with the selection, and causes a web browser to receive information and render a web page to present the received information. The graphical user interface screens associated with the available selections 308, 310, 314, and 318 are described below in connection with FIGS. 4-25.

Figure 4:
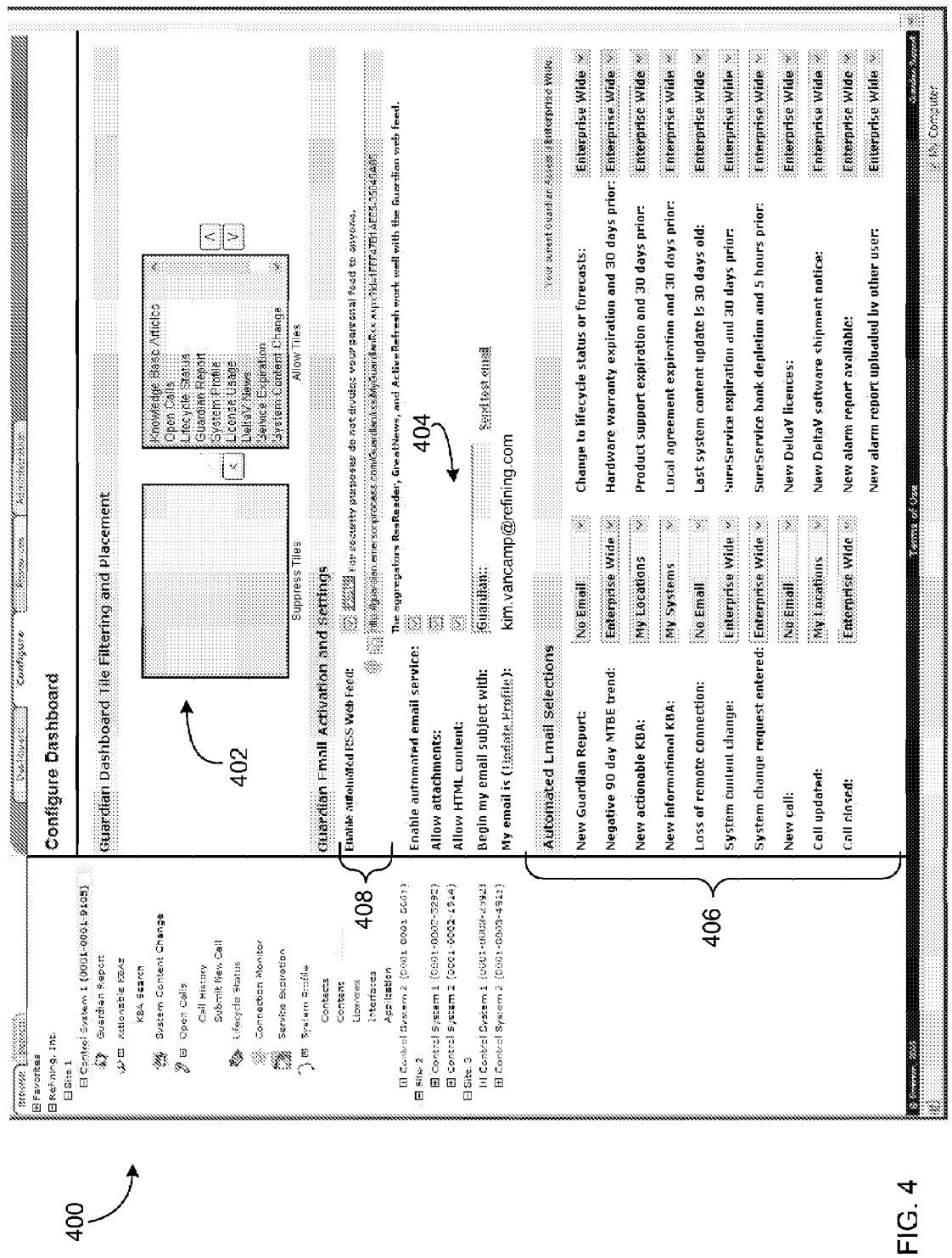
FIG. 4 is a graphical user interface of an example configuration screen that enables users to configure various features associated with the online maintenance system of FIG. 1.

Returning to FIG. 2, the example hierarchy map 200 depicts an example feature configuration screen 400 that may be invoked from the main menu screen 300 by selecting one of the tabs 318. A detailed depiction of the example feature configuration screen 400 is shown in FIG. 4. In the illustrated example, the feature configuration screen 400 enables users to change settings associated with various features of the example online maintenance system 102 (FIG. 1). For example, a user may change the configuration of the main menu screen 300 of FIG. 3 and configure e-mail notifications or other notifications (e.g., RSS notifications).

As shown in FIG. 4, the feature configuration screen 400 includes filtering and placement of user interface ("UI") controls 402 for filtering and arranging the maintenance category information tiles 314 on the main menu screen 300. The feature configuration screen 400 also includes a plurality of e-mail activation and setting UI controls 404 used to enable automated e-mail services and to configure the appearance and destination address of e-mails. The e-mail activation and setting UI controls 404 may be used to specify particular e-mail formats (e.g., e-mail security formats) that are compatible with security settings of a user's e-mail server and e-mail security system. For example, some e-mail servers and security systems may accept/deliver only plain text e-mails while others may accept/deliver e-mails containing hypertext markup language ("HTML").

In addition, the feature configuration screen 400 includes a plurality of e-mail type and content UI controls 406 that may be used to select the event types that should trigger automatic transmission of an e-mail and the type of information that should be included in the e-mail. In the illustrated example, for each type of e-mail displayed in the e-mail type and content UI controls 406, a user may select to receive no e-mail corresponding to particular e-mail types, e-mail for process control systems to which the user is assigned, or all systems in an enterprise. For example, a user may use the plurality of e-mail type and content UI controls 406 to select to receive information relevant to the user's job responsibilities and/or relevant to particular process control systems or portions thereof (e.g., process control systems or portions thereof that the user is responsible for operating, maintaining, etc.). For example, the user may use the plurality of e-mail type and content UI controls 406 to select a "My Systems" option to indicate, for example, the process control systems displayed in the enterprise browse display area 302 of FIG. 3.

Of course, in other implementations, the feature configuration screen 400 may include UI controls associated with configuring any other feature or service of the example online maintenance system 102. For each user, the information provided via the feature configuration screen 400 is stored in that user's contact record, which is stored in the SMS server 108 of FIG. 1. The feature configuration screen 400 also includes really simple syndication ("RSS") settings 408 to enable delivering messages, notifications, alerts, etc. to users via RSS feed.

Figure 5:
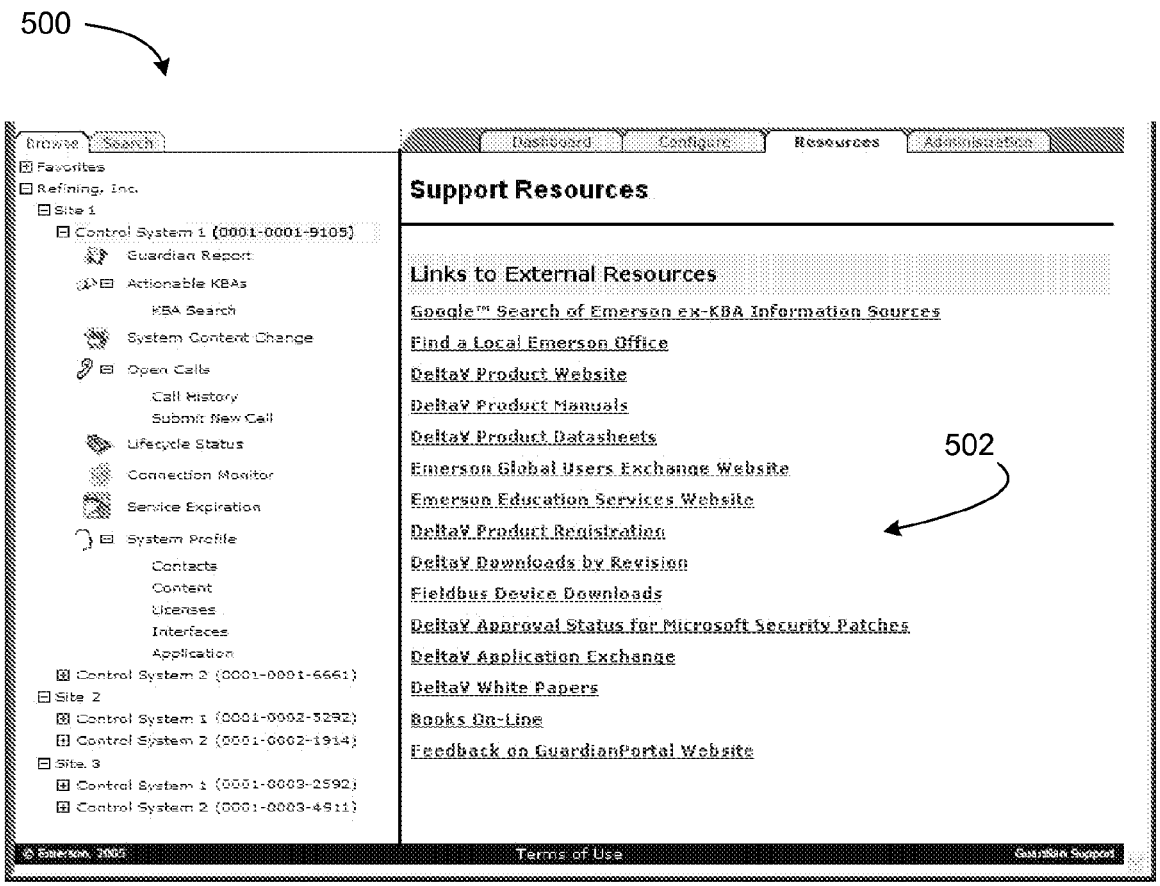
FIG. 5 is a graphical user interface of an example support resources screen that may be used to display a plurality of hyperlinks to access various support resources associated with maintaining process control systems.
Figure 7:
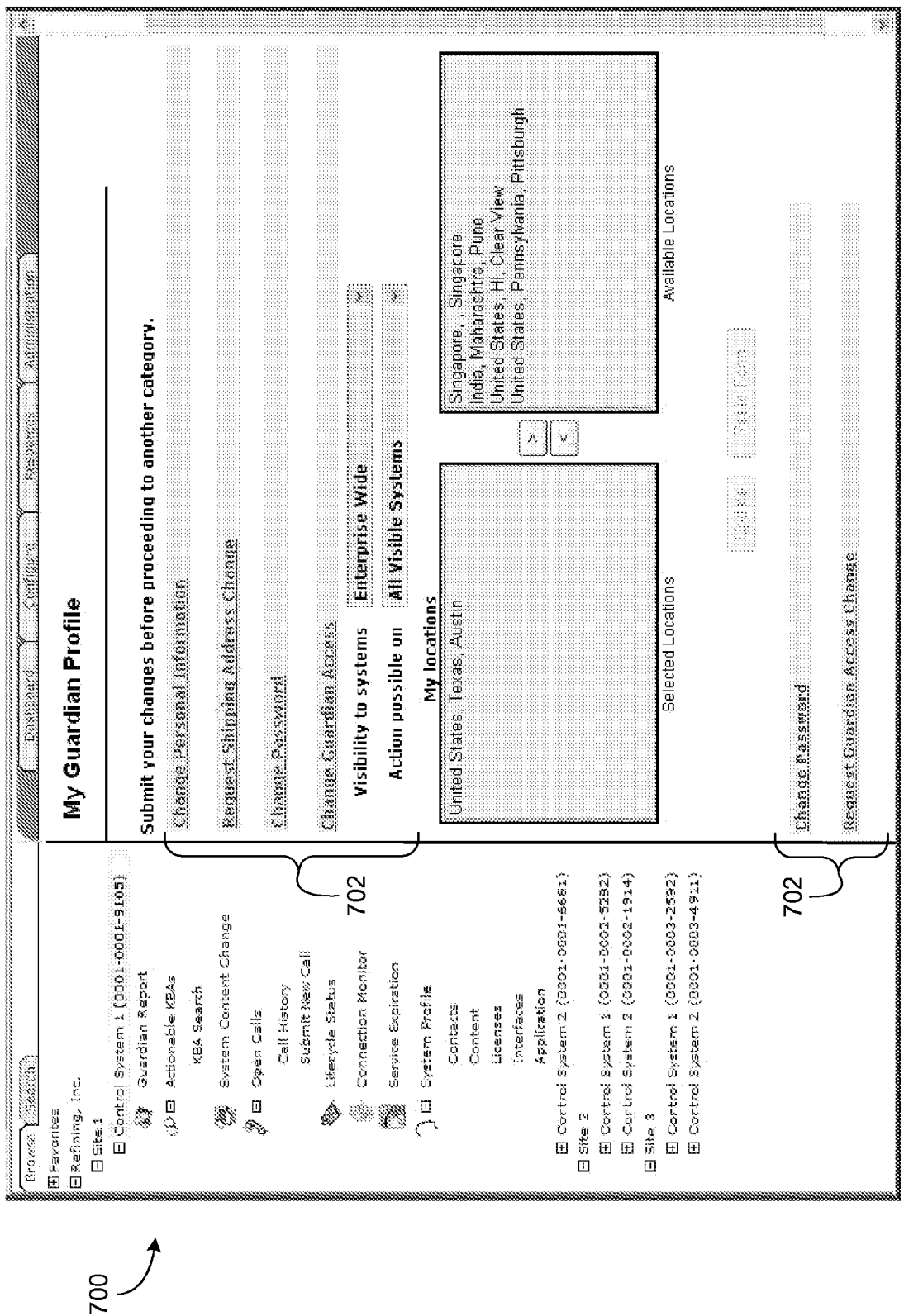
FIG. 7 is a graphical user interface of an example user profile screen that may be used to view and/or modify user profiles associated with accessing an online portal of the example online maintenance system of FIG. 1.

Returning to FIG. 2, the example hierarchy map 200 depicts an example support resources screen 500 accessible from the main menu screen 300 by selecting one of the tabs 318. A detailed depiction of the example support resources screen 500 is shown in FIG. 5. As shown in FIG. 5, the support resources screen 500 displays a plurality of hyperlinks 502, selection of which links or directs a web browser application to other web pages or documents associated with the selected hyperlinks. The hyperlinks 502 may direct a user to external resources associated with products (e.g., hardware, software, services, etc.) used to implement an enterprise's process control systems (e.g., the process control systems 118 and 120 of FIG. 1). The hyperlinks 502 may also lead to support information pertaining to the example online maintenance system 102, industry news, technical publications, service office locations, customer feedback web pages, or any other information. Some of the information linked to by the hyperlinks 502 is specific to an enterprise's process control system implementations.

Figure 6:
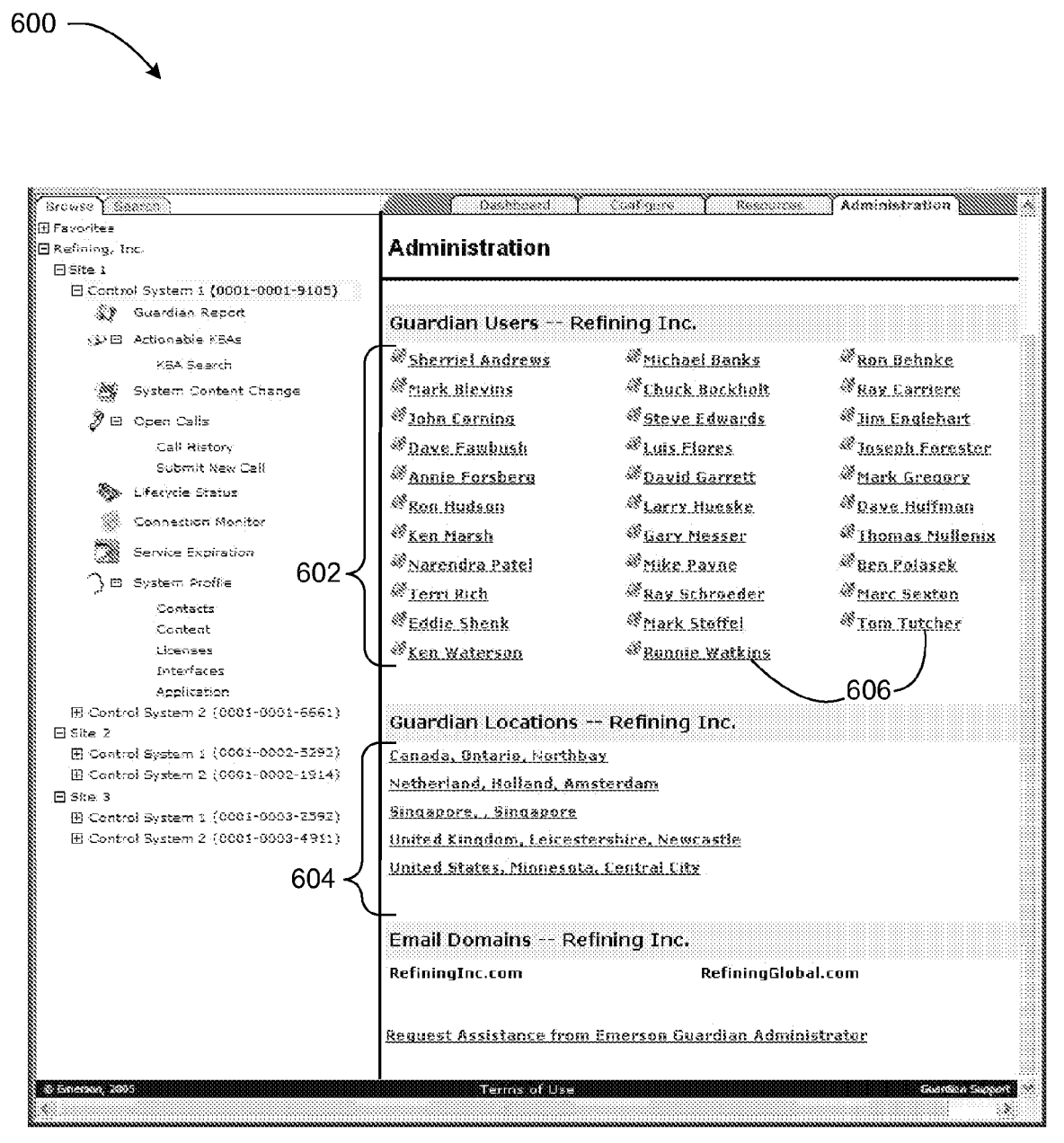

The example hierarchy map 200 of FIG. 2 also depicts an example user administration screen 600 that may be accessed by selecting one of the tabs 318 on the main menu screen 300 of FIG. 3. The example online maintenance system 102 may be configured to provide access to the example user administration screen 600 only to those users having administration access rights. A detailed depiction of the example user administration screen 600 is shown in FIG. 6. The example user administration screen 600 includes a user administration display area 602 and a location administration display area 604. The user administration display area 602 displays a plurality of user name links 606 that provide administrators access to system features available to each user so that an administrator may modify user rights assigned to each user and/or other user configurations. The location administration display area 604 displays a plurality of location links indicative of sites (e.g., the sites 110, 112, and 114 of FIG. 1) in different geographical locations in which process control systems of an enterprise are communicatively coupled to the example online maintenance system 102 of FIG. 1. An administrator may configure how information associated with each of the sites 110, 112, and 114 is presented to users that logon to the example online maintenance system 102. In some cases, the administrator may configure users to have access to information associated with only some of the sites 110, 112, and 114. In the illustrated example, the information provided via the example user administration screen 600 is stored in the SMS server 108.

The example hierarchy map 200 of FIG. 2 also depicts an example user profile screen 700 accessible from the main menu screen 300 of FIG. 3. The example user profile screen 700, which is shown in detail in FIG. 7, includes links 702 that may be selected by users to view and/or modify their personal information (e.g., a name, a department, a job title, phone numbers, an e-mail address, etc.) or other information including, for example, e-mail addresses, passwords, access rights, accessible process control systems, process control systems associated with the user's job responsibilities, process control systems of interest, etc. In the illustrated example, the information provided via the example user profile screen 700 is stored in user contact records in the SMS server 108.

Figure 8:
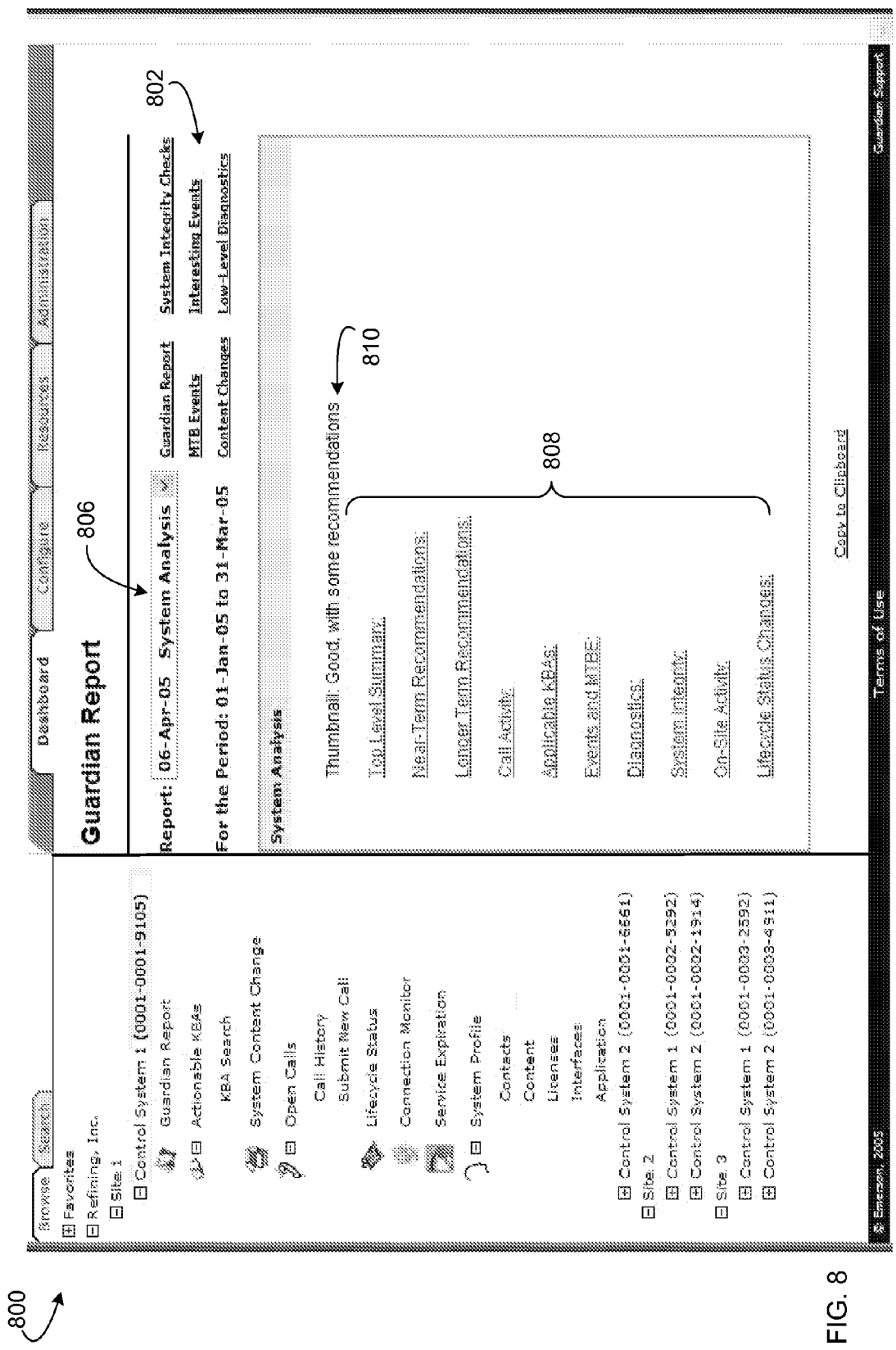
FIG. 8 is a graphical user interface of an example report access screen that may be used to display a listing of available reports generated by the example online maintenance system of FIG. 1.

The example hierarchy map 200 of FIG. 2 also depicts an example report access screen 800 that can be accessed by selecting one of the tiles 314 of the main menu screen 300 of FIG. 3. The example report access screen 800, which is shown in detail in FIG. 8, can be used to access reports prepared for a process control system selected in the enterprise browse display area 302 of FIG. 3. As shown in FIG. 8, the example report access screen 800 displays a plurality of report category descriptors 802. Each of the report category descriptors 802 is associated with a plurality of detailed reports 804 (FIG. 2). The detailed reports 804 are generated based on events generated by the messenger server 136 while monitoring the process control systems 118 and 120. In the illustrated example, selecting a system analysis report category 806 causes the example online maintenance system 102 to provide a plurality of detailed report links 808 pertaining to the system analysis report category 806. The example online maintenance system 102 also provides a thumbnail summary 810 summarizing the information contained in the detailed reports 804 (FIG. 2) associated with the detailed report links 808. In this manner, after selecting a particular one of the report category descriptors 802, a user may quickly look to the thumbnail summary 810 to see whether there is any poor performance within a process control system of interest.

In the illustrated example, each of the detailed reports 804 (FIG. 2) linked to by the detailed report links 808 may be stored in the SMS server 108 in extensible markup language ("XML") format. As the example online maintenance system 102 monitors the operations of the process control systems 118 and 120, the SMS server 108 receives event and alarm data from the messenger server 136 and stores the collected event and alarm data in respective data structures to subsequently generate the detailed reports 804 (FIG. 2). In some example implementations, selection of one of the detailed report links 808 causes the SMS server 108 to retrieve the event and alarm data previously received from the messenger server 136 and to dynamically generate a selected one of the detailed reports 804 for display to a user. In other example implementations, the detailed reports 804 can be generated in advance and stored in the SMS server 108 for subsequent retrieval so that the detailed reports 804 need not be dynamically generated at the time access is requested. In any case, the detailed reports 804 may be selected to reflect data obtained during particular selectable times (e.g., data generated by the messenger server 136 between 8 am and 5 pm on a particular date).

Figure 9:
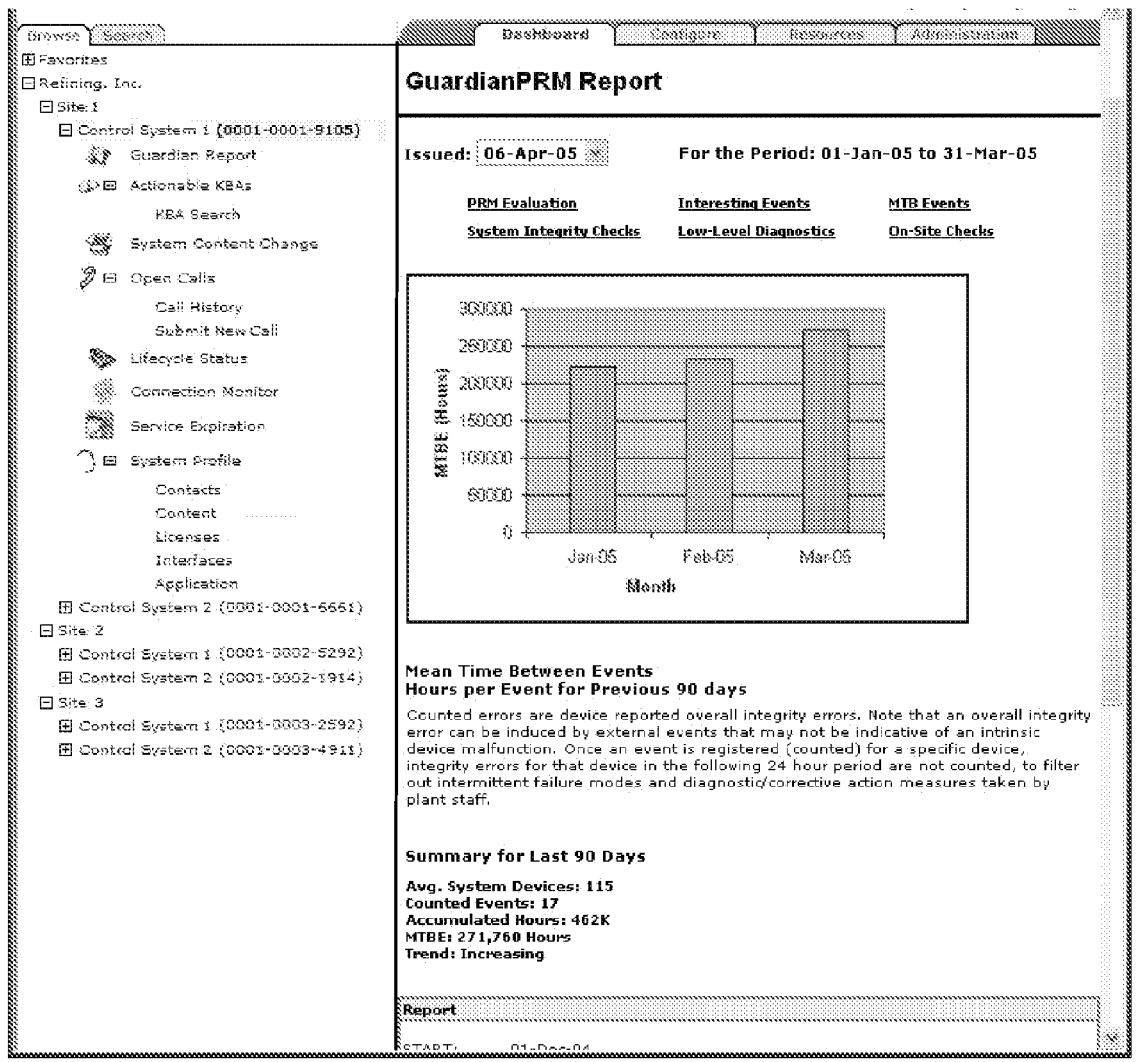
FIG. 9 is a graphical user interface of an example report accessed via the example report access screen of FIG. 8.

FIG. 9 illustrates a graphical user interface used to implement an example detailed report screen 900 displaying information retrieved from one of the detailed reports 804 of FIG. 2. The example detailed report screen 900 displays analytic information associated with the mean time between events generated by the messenger server 136 (FIG. 1) for one of the process control systems 118 and 120 of FIG. 1. Of course, detailed report screens for others of the detailed reports 804 may display different information in different arrangements.

Figure 10:
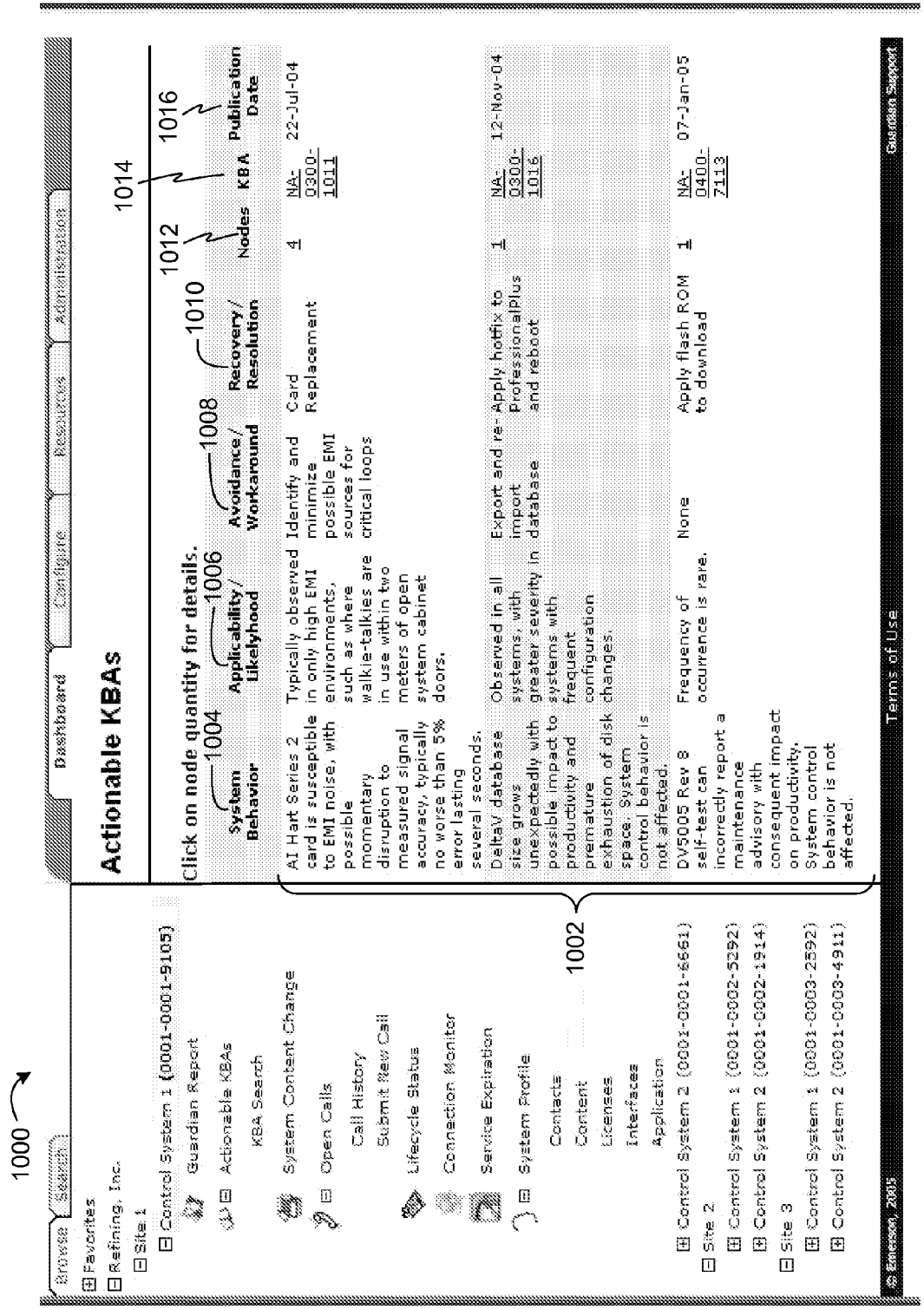
FIG. 10 is a graphical user interface of an example actionable knowledgebase articles ("KBA's") summary screen that may be used to indicate knowledgebase articles applicable to particular portions of the example process control systems of FIG. 1.

Returning to FIG. 2, the example hierarchy map 200 includes an example actionable knowledgebase article ("KBA") summary screen 1000, which may be accessed from the main menu screen 300 by selecting one of the tiles 314. A detailed depiction of the example actionable KBA summary screen 1000 is shown in FIG. 10. A KBA is a data entry stored in a data structure within the SMS server 108 (FIG. 1) and includes information pertaining to reported, identified, or discovered issues related to hardware, software, firmware, etc. used to implement process control systems (e.g., the process control systems 118 and 120 of FIG. 1). KBA's may be generated by users of the example online maintenance system 102 and/or by process control hardware manufacturers and software developers (e.g., the device manufacturer 138 and the software developer 140 of FIG. 1) and stored in the SMS server 108 of FIG. 1 for subsequent retrieval. In some example implementations, KBA's may be obtained from publicly accessible support bulletin boards to which users (e.g., employees of other companies) submit bug reports or known system anomalies for community cooperation. To enable matching KBA's to corresponding process control systems or parts thereof (e.g., devices, hardware, software, firmware, etc.), KBA's include information (e.g., device types, serial numbers, model numbers, version information, etc.) identifying process control system components to which the KBA's are applicable or relevant. Example information in the KBA's is described in detail below in connection with an example actionable KBA detailed information screen 1100 of FIG. 11.

As shown in FIG. 10, the example actionable KBA summary screen 1000 displays summary information associated with a plurality of KBA's 1002. In the illustrated example, each KBA includes information indicative of system behavior 1004 (e.g., the potential effect on system behavior if a condition is not addressed), applicability/likelihood 1006 (e.g., the probability a process control system will be affected), avoidance/workaround 1008 (e.g., preventive action), and recovery/resolution 1010 (e.g. long-term, permanent solution). A KBA also includes an action descriptor (not shown) that associates the KBA to a particular action category such as, for example, an immediate action category (e.g., must remedy to prevent or stop system behavior that may cause severe or extreme repercussions), a required action category (e.g., must take action at some point), an advisement category (e.g., may improve system performance, efficiency, etc.), or an information only category.

The example actionable KBA summary screen 1000 also displays a node quantity 1012 indicative of a quantity of nodes (e.g., one or more of the nodes 126*a-c* of the first control system 118) to which each of the KBA's 1002 is applicable or relevant. To identify the nodes within a process control system (e.g., the process control systems 118 and 120 of the first site 110 of FIG. 1 and/or the process control systems (not shown) of the second and third sites 112 and 114 of FIG. 1) to which a KBA applies, the SMS server 108 may execute a KBA matching process described below in connection with flow diagrams depicted in FIGS. 28-30. In general, the KBA matching process compares information stored in a KBA (e.g., identification information, device type, criteria, etc. described below in connection with the example actionable KBA detailed information screen 1100 of FIG. 11) to information pertaining to equipment (e.g., field devices) communicatively coupled to the nodes (e.g., the nodes 126*a-c* and 128*a-b* of FIG. 1) of a process control system (e.g., the process control systems 118 and 120 of FIG. 1) and/or to information of other components (e.g., hardware, software, firmware, etc.) of the process control system.

Also, the example actionable KBA summary screen 1000 displays a KBA publication number 1014 and a KBA publication date 1016 for each KBA. Selecting values or descriptors pertaining to the node quantity 1012, the KBA publication number 1014, or the KBA publication date 1016 causes the SMS server 108 to provide detailed KBA information via detailed KBA screens 1018 (FIG. 2). Additionally, a user may access a KBA search screen 1020 (FIG. 2) to retrieve detailed KBA information associated with a KBA of particular interest.

FIG. 11 depicts the example actionable KBA detailed information screen 1100 selected from one of the detailed KBA screens 1018 (FIG. 2). The web page server 106 of FIG. 1 can serve the actionable KBA detailed information screen 1100 in response to a user selecting one of the values or descriptors pertaining to the node quantity 1012, the KBA publication number 1014, or the KBA publication date 1016. The detailed KBA information shown in the actionable KBA detailed information screen 1100 pertains to the first KBA entry shown in the actionable KBA summary screen 1000. Specifically, the detailed KBA information includes KBA criteria or KBA attributes that describe the node types (e.g., device types) (displayed in node type fields 1102) to which the selected KBA applies. The detailed information (e.g., KBA criteria) also indicates the node identifiers (displayed in node identifier fields 1104) of each node, the model descriptions of the devices (displayed in model description fields 1106), the serial numbers of the devices (displayed in serial number fields 1108), and the software and hardware revision numbers (displayed in software and hardware revision number fields 1110 and 1112) associated with the devices.

Figure 12:
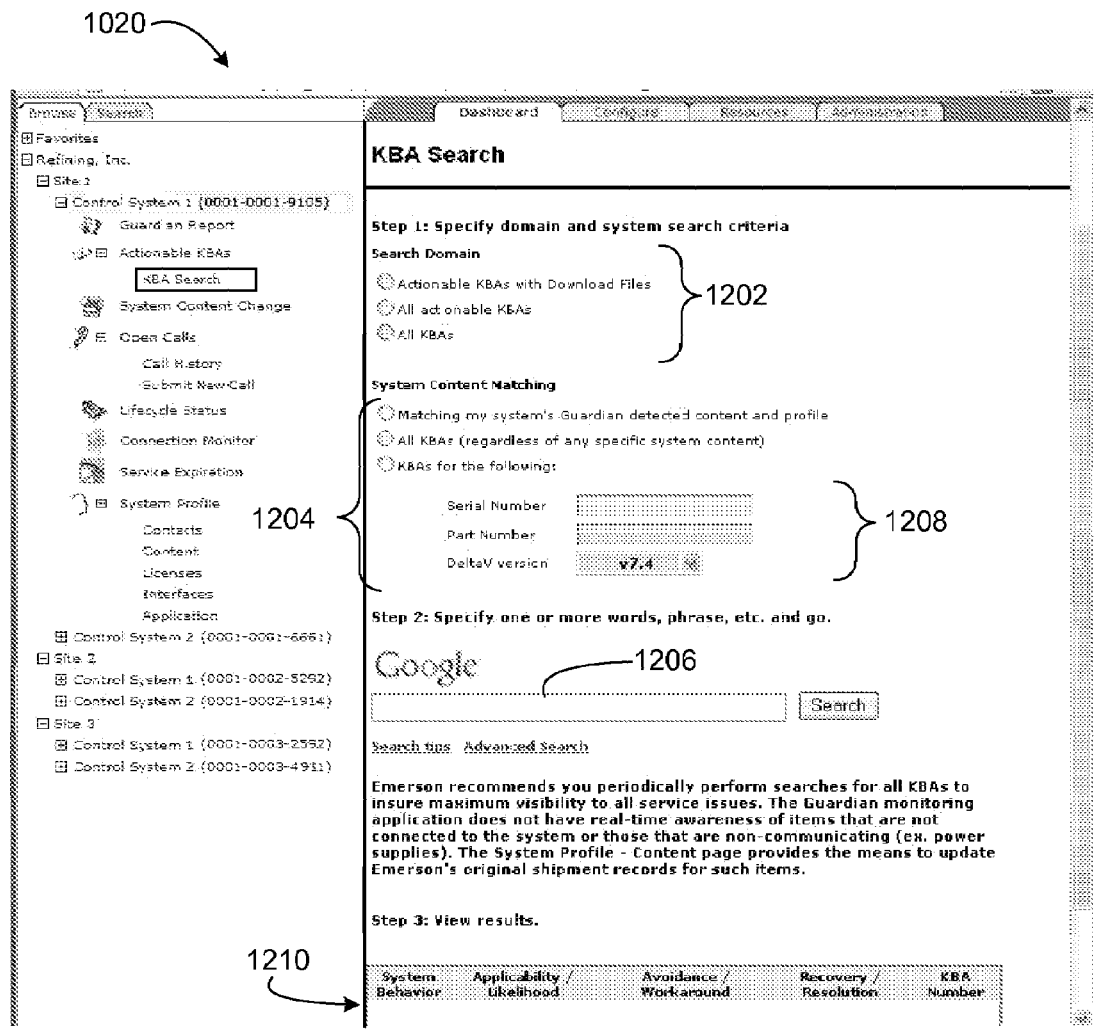
FIG. 12 is a graphical user interface of an example KBA search screen that may be used to find KBA's associated with particular criteria via the example online maintenance system of FIG. 1.

FIG. 12 depicts a detailed illustration of the example KBA search screen 1020 (FIG. 2). A user may perform a search by selecting search domain criteria 1202, selecting system content matching criteria 1204, and specifying one or more words, phrases, etc. in a search text box 1206. In the illustrated example, the domain criteria 1202 enables a user to specify whether to search all KBA's, only actionable KBA's, or only actionable KBA's having download files (e.g., software/firmware updates, technical documentation, diagnostic routines, patches, data analysis routines, etc.). The system content matching criteria 1204 enables a user to specify specific process control system configurations (e.g., system profile) and the type of equipment (i.e., system content) used to implement a particular process control system. For example, a user may want to search for KBA's applicable to particular equipment serial numbers, part numbers, or software version numbers. A user may manually enter the criteria via text boxes 1208 or may elect to search for any KBA applicable to any content and profile of a process control system. Additionally, the user may request to search KBA's regardless of system content and profile. In the illustrated example, the example KBA search screen 1020 displays search results in a results display area 1210.

Figure 13:
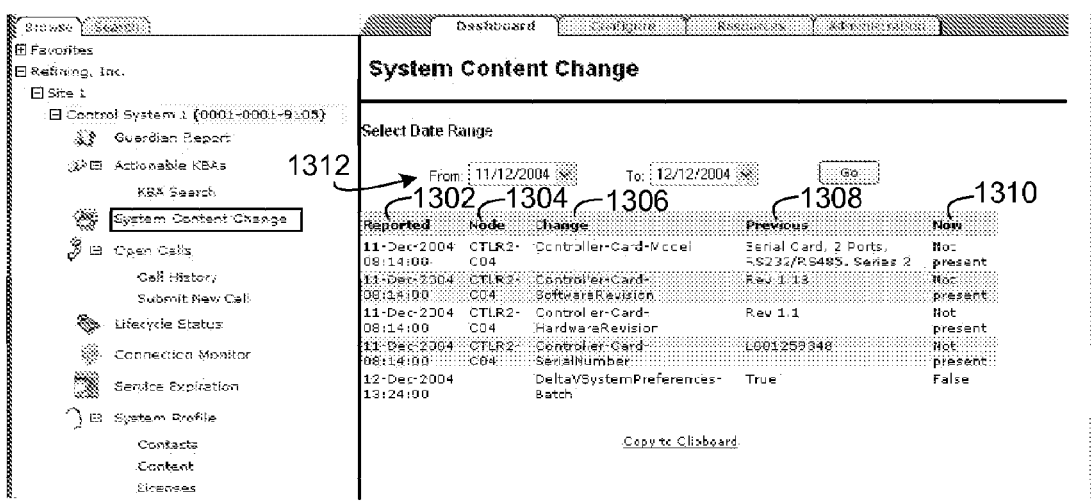
FIG. 13 is a graphical user interface of an example system content changes screen that may be used to display changes that occur within the process control systems of FIG. 1.

Returning to FIG. 2, the example hierarchy map 200 includes an example system content change screen 1300 that may be accessed by selecting one of the tiles 314 in the main menu screen 300. A detailed depiction of the example system content change screen 1300 is illustrated in FIG. 13. The system content change screen 1300 is used to display any changes made to the configuration of process control systems (e.g., the process control systems 118 and 120 of FIG. 1). System content changes may indicate the addition, replacement, or removal of equipment (e.g., the controllers 122 and 124; field devices coupled to the nodes 126*a-c* and 128*a-b*; the workstation terminals 130 and 132; etc.), enablement or disablement of equipment, software/firmware updates, equipment servicing, etc.

The content change information may be generated by the messenger server 136 of FIG. 1. For example, during operation, the messenger server 136 may monitor for any changes in the process control systems 118 and 120 of FIG. 1 and generate an event each time a system content change has occurred. The messenger server 136 may then transmit the system content change events to the SMS server 108 and the SMS server 108 may store the event information in one or more data structures. In the illustrated example of FIG. 13, for each system content change event, the SMS server 108 stores a reported date and time 1302 (e.g., the date and time at which the messenger server 136 generated an event for the detected change), a changed node descriptor 1304 (e.g., the node that underwent the change), a change description 1306 (e.g., the type of change that occurred), a previous state descriptor 1308 (e.g., the state of the node prior to the change), and a current state descriptor 1310 (e.g., the state of the node after the change). Some or all of the information stored in the SMS server 108 for each content change event can be shown via the example system content change screen 1300 as shown in FIG. 13.

The example system content change screen 1300 also shows date range UI controls 1312 that may be used to specify date ranges of interest within which the messenger server 136 reported system content changes. If a user is interested in finding system content changes that occurred within a particular range of dates, the user may specify the date range in the date range UI controls 1312 to retrieve only the system content changes that occurred within that date range.

Figure 14:
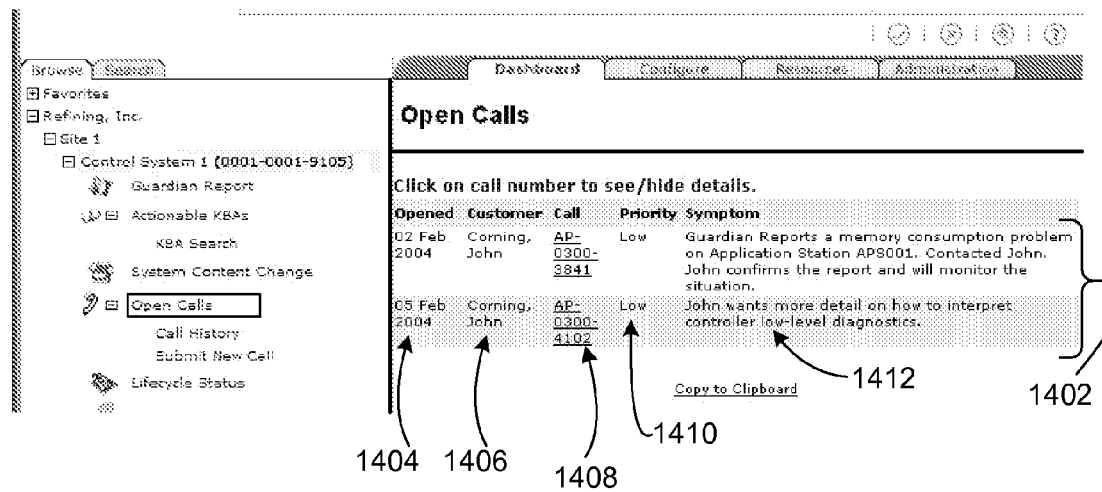
FIG. 14 is a graphical user interface of an example open calls summary screen that may be used to display open service calls associated with the process control systems of FIG. 1.

Returning again to FIG. 2, the example hierarchy map 200 also includes an example open calls summary screen 1400 that may be accessed by selecting one of the maintenance category information tiles 314 of the main menu screen 300 of FIG. 3. A detailed depiction of the example open calls summary screen 1400 is shown in FIG. 14. The open calls summary screen 1400 is used to display open service call entries 1402 including summary information associated with open service calls pertaining to equipment or software/firmware within process control systems (e.g., the process control systems 118 and 120 of FIG. 1). As shown in FIG. 14, each open call entry 1402 includes an open date 1404, a customer identifier 1406 (e.g., a customer name, a customer identification number, etc.), a call identifier 1408, a priority value 1410, and a symptom description 1412. Using the open calls summary screen 1400, a user may quickly view the number of open calls and the nature of those calls.

As shown in FIG. 2, a plurality of open calls detail screens 1414 may be accessed via the open calls summary screen 1400. Each of the open calls detail screens 1414 pertains to one of the open call entries 1402 of FIG. 14. In operation, to view details associated with a particular one of the open call entries 1402, a user selects the call identifier 1408 associated with the open call entry 1402 of interest.

Figure 15:
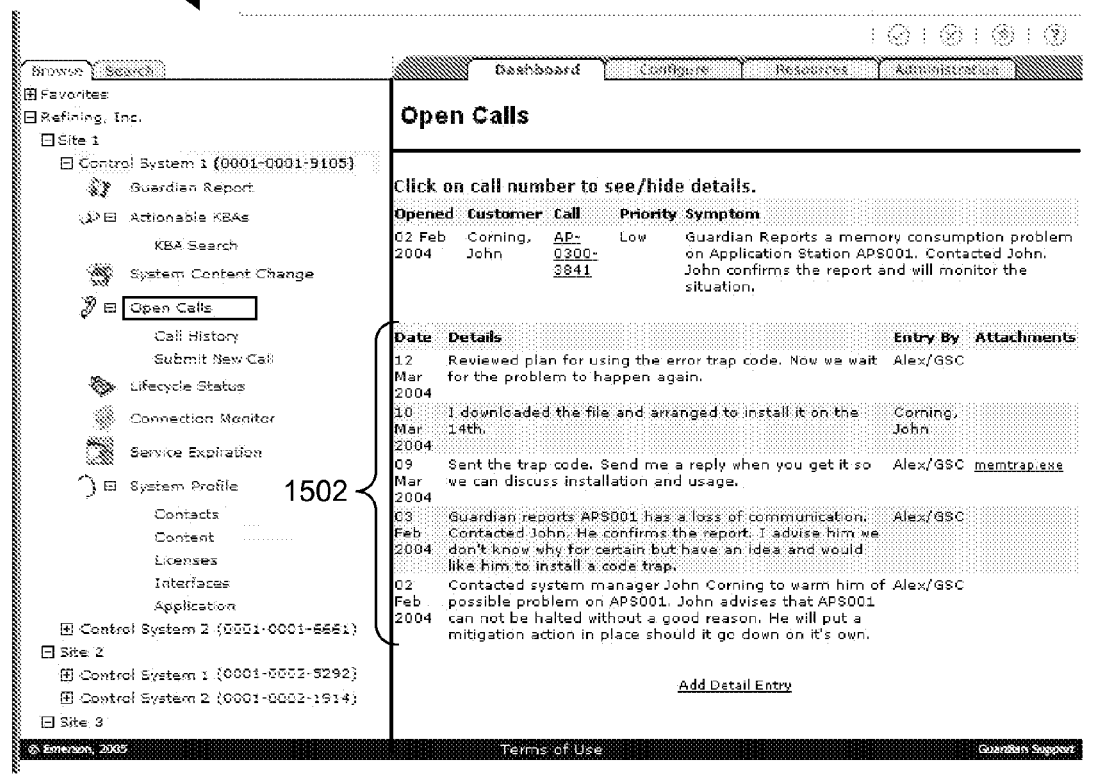
FIG. 15 is a graphical user interface of an example open call details screen that may be used to display detailed information associated with an open call selected via the example open calls summary screen of FIG. 14.

A detailed depiction of an example open call details screen 1500 (e.g., one of the open call detail screens 1414 of FIG. 2) is shown in FIG. 15. In the illustrated example, the open call details screen 1500 corresponds to the first one of the open call entries 1402 of FIG. 14. The open call details screen 1500 includes a status display area 1502 in which user entries are displayed to describe the types of activities that have been performed in connection with the selected open call. In this manner, a user may analyze a history of any changes or maintenance performed for the open call to determine any subsequent activity or to determine whether the open service call should be closed as resolved.

Figures 16, 17:
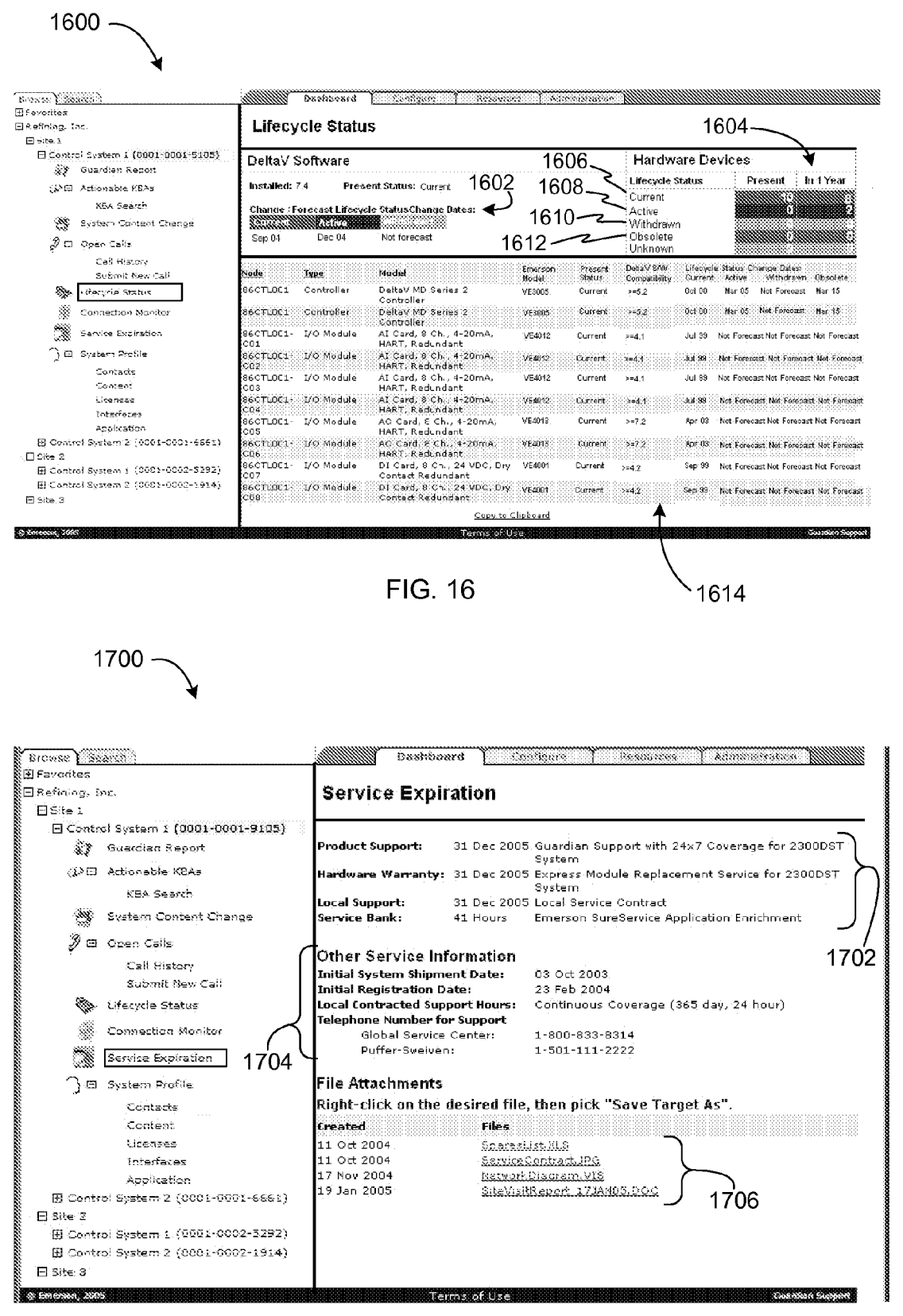

As shown in FIG. 2, the example hierarchy map 200 also includes an example lifecycle status screen 1600 that may be accessed by selecting one of the information tiles 314 of the main menu screen 300 of FIG. 3. A detailed depiction of the example lifecycle status screen 1600 is shown in FIG. 16. In the illustrated example, the example lifecycle status screen 1600 is used to display information pertaining to present and forecasted lifecycle status associated with each device, apparatus, or equipment (e.g., field devices communicatively coupled to the nodes 126a-c and 128a-b, the controllers 122 and 124, the workstation terminals 130 and 132, etc. of FIG. 1) within a process control system (e.g., the process control systems 118 and 120 of FIG. 1). The example lifecycle status screen 1600 may also be used to display information pertaining to the lifecycle categories associated with software and/or firmware.

To display the lifecycle status of software and/or firmware within a process control system, the example lifecycle status screen 1600 includes a software status display area 1602. The software status display area 1602 may display the status of installed process control system software/firmware components. For example, the software display area 1602 may display the lifecycle status of the software used to implement the example online maintenance system 102 of FIG. 1, control management software used to manage the operations of process control systems, firmware installed in field devices, etc.

To display the summary information about the lifecycle status of hardware devices (e.g., field devices communicatively coupled to the nodes 126a-c and 128a-b, the controllers 122 and 124, the workstation terminals 130 and 132, etc. of FIG. 1), the example lifecycle status screen 1600 includes a hardware device summary display area 1604. The hardware device summary display area 1604 may display total quantities of devices associated with each lifecycle status category at a present time and the forecasted quantities at some time in the future (e.g., one-year in the future). The example online maintenance system 102 may associate each device with one or more of four lifecycle categories: a current category 1606, an active category 1608, a withdrawn category 1610, and an obsolete category 1612.

To display detailed lifecycle status information for each hardware device within a process control system, the example lifecycle status screen 1600 includes a status listing display area 1614. The status listing display area 1614 displays detailed information (e.g., node address, device type, device model, etc.) about each hardware device and dates associated with the lifecycle status of each device. In the illustrated example, a date listed under the current category 1606 indicates that a respective device has been updated to use technology that is current as of the listed date (e.g., hardware and/or software/firmware manufactured or released on the listed date). A date listed under the active category 1608 indicates the date on which the respective device was activated or will be activated for operation. A date listed under the withdrawn category 1610 indicates the date on which the device was withdrawn or will be withdrawn from operation. A date listed under the obsolete category 1612 indicates the date on which the device became or will become obsolete.

Returning again to FIG. 2, the example hierarchy map 200 also includes an example service expiration screen 1700 that may be accessed by selecting one of the information tiles 314 of the main menu screen 300 of FIG. 3. A detailed depiction of the example service expiration screen 1700 is shown in FIG. 17. The service expiration screen 1700 is used to display product warranty and support services information. In the illustrated example of FIG. 17, the service expiration screen 1700 displays descriptions and expiration dates associated with a plurality of subscribed services 1702. The service expiration screen 1700 also displays additional service information 1704 that includes, for example, service contact numbers, support hours availability, etc. In addition, the service expiration screen 1700 displays a plurality of available service information files 1706 including, for example, updated spare parts lists, service agreements, schematic diagrams, service personnel reports, etc.

The example hierarchy map 200 of FIG. 2 also includes an example system content screen 1800 that may be accessed by selecting a hyperlink associated with one of the information tiles 314 of the main menu screen 300 of FIG. 3. A detailed depiction of the example system content screen 1800 is shown in detail in FIG. 18. The example system content screen 1800 may be used to display summary information indicative of the various components within the process control systems of FIG. 1 (e.g., the process control systems 118 and 120 in the first site 110 or any process control systems within the second and third sites 112 and 114).

The example system content screen 1800 includes a system devices display area 1802 that includes a listing of system device types and a quantity of each device type within a process control system selected in the enterprise browse display area 302. In the illustrated example, the system device types include computers (e.g., the workstation terminals 130 and 132 of FIG. 1), controllers (e.g., the controllers 122 and 124 of FIG. 1), I/O modules, power supplies, and other devices. A system devices details hyperlink 1804 is provided to invoke a system device details screen 1900 (FIG. 19) from the example system content screen 1800 to display detailed information associated with the listed system device types. The system device details screen 1900 is described below in connection with FIG. 19.

The example system content screen 1800 also includes an I/O bus devices display area 1806 that may be used to display field device types and quantity values indicative of the quantity of field devices within a process control system. In the illustrated example, field device types are grouped into bus-type categories. A bus devices details hyperlink 1808 is provided to enable retrieving detailed information associated with the listed bus device types. Selecting the bus devices details hyperlink 1808 causes the web page server 106 of FIG. 1 to serve a bus device details screen (not shown) that may display substantially similar types of information as that displayed via the system device details screen 1900.

A system profile display area 1810 in the example system content screen 1800 enables a user to select characteristics of devices for which the user wishes to see summary information displayed in the example system content screen 1800. For example, if a user wishes to see quantity information for only Fieldbus devices, the user can select only the Fieldbus checkbox 1812 and submit the request or change. In this manner, after a refresh, the example system content screen 1800 displays quantity values pertaining only to Fieldbus devices in a selected process control system.

Figure 18:
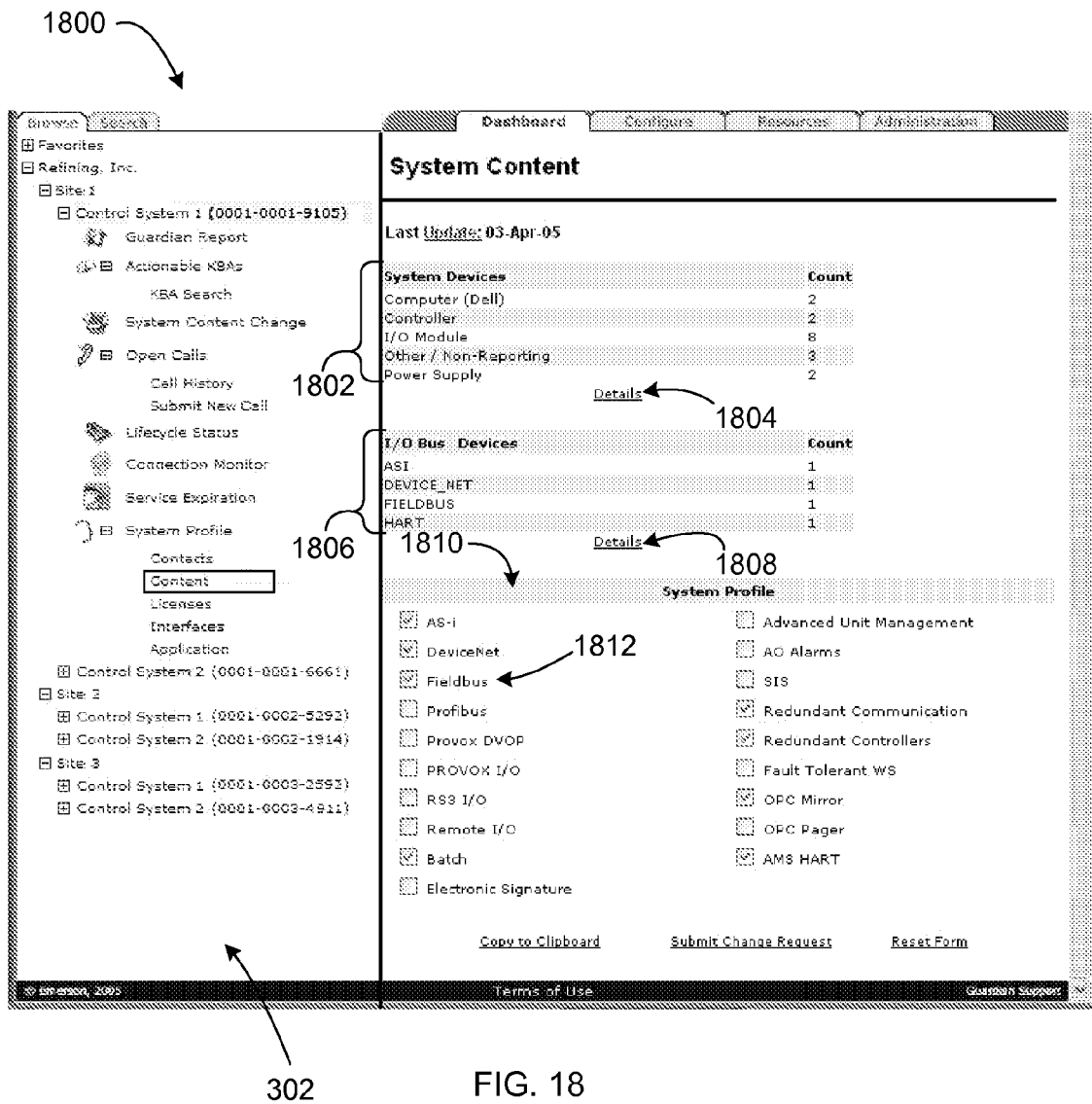
FIG. 18 is a graphical user interface of an example system content screen that may be used to display a summary of the components within the process control systems of FIG. 1.
Figure 19:
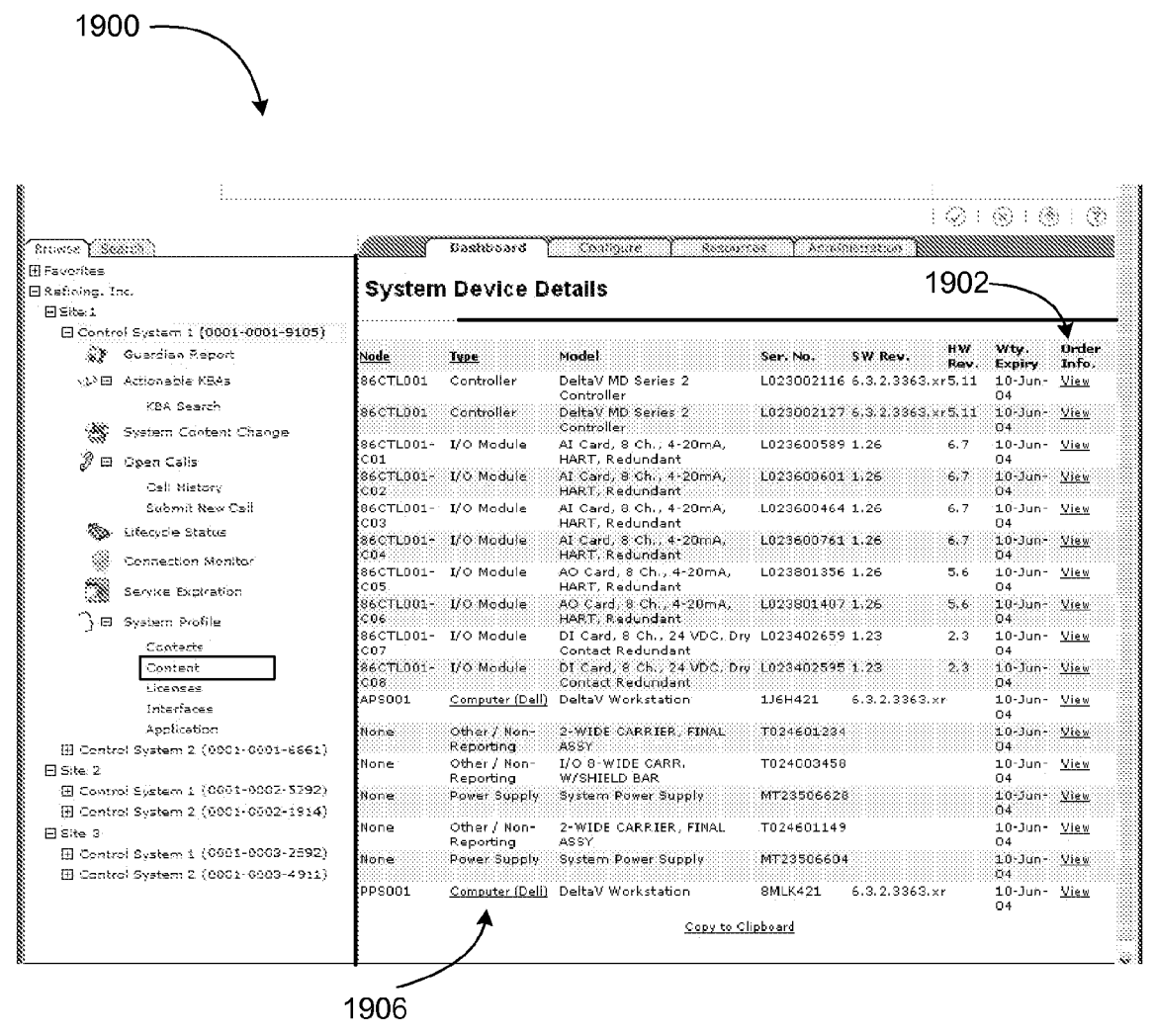

FIG. 19 is a graphical user interface of the example system devices details screen 1900 that may be used to display a listing of detailed information associated with the system devices and equipment used to implement the process control systems of FIG. 1 (e.g., the process control systems 118 and 120 in the first site 110 or any process control systems within the second and third sites 112 and 114). In particular, as described above, the example system devices details screen 1900 may be accessed from the example system content screen 1800 by selecting the system devices details hyperlink 1804 (FIG. 18). After selection of the system devices details hyperlink 1804, the web page server 106 (FIG. 1) obtains the system devices detailed information from the SMS server 108 (FIG. 1) and serves the detailed information for display as shown in FIG. 19.

In the illustrated example, the system devices detailed information displayed via the system devices detailed screen 1900 includes node addresses, device type descriptors, model descriptors, serial numbers, software revisions, hardware revisions, and warranty expiration dates. Of course, in alternative implementations more or fewer information may be displayed.

The system devices detailed screen 1900 also displays order information hyperlinks 1902. Each of the order information hyperlinks 1902 corresponds to one of the listed system devices and may be selected to retrieve ordering and purchasing information for a respective system device. In this manner, a user (e.g., an operator, a system engineer, a maintenance technician, etc.) may relatively easily identify a system device of interest from the detailed listing and, if so desired, order a replacement part or learn how to order a replacement part for that identified device from the same screen in which the user identified the system device of interest.

Also displayed in the system devices detailed screen 1900 is a device-specific hyperlink 1906 that is provided to enable viewing further detailed information associated specifically with a particular system device. In the illustrated example, the device-specific hyperlink 1906 corresponds to a workstation (e.g., one of the workstation terminals 130 or 132 of FIG. 1). By selecting the device-specific hyperlink 1906, device-level detailed information screen 2000 (FIG. 20) can be accessed from the system devices detailed information screen 1900 as shown in FIG. 2. Specifically, selecting the hyperlink 1906 causes the web page server 106 (FIG. 1) to retrieve further detailed information associated specifically with the corresponding system device and to serve the detailed information for display via the device-level detailed information screen 2000 shown in detail in FIG. 20.

Figures 20, 21:
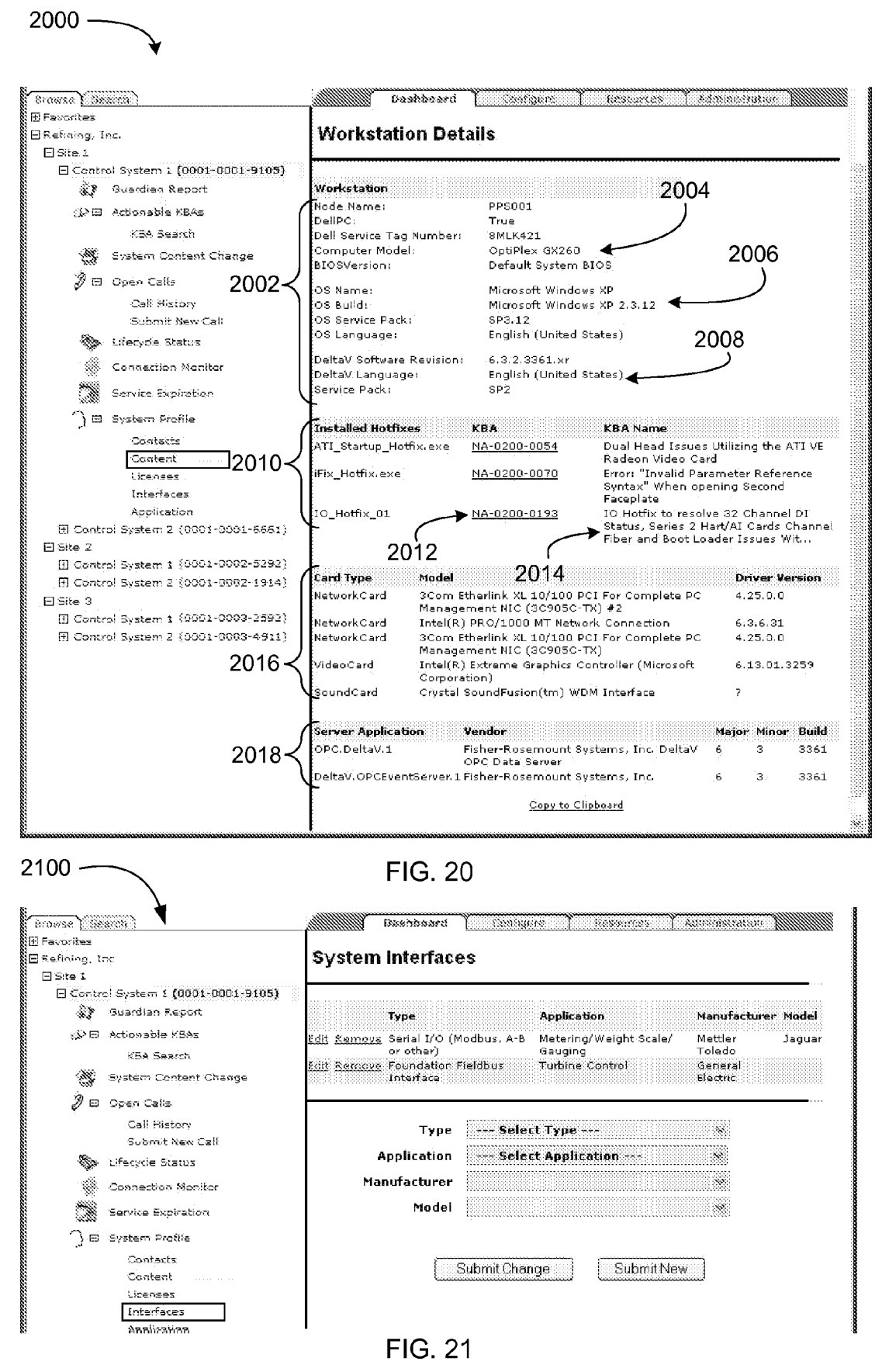

As shown in FIG. 20, the device-level detailed information screen 2000 includes a device configuration display area 2002 that is provided to display configuration information (e.g., hardware and software identifiers) describing the hardware and software within a corresponding device. In the illustrated example, the configuration information displayed in the device configuration display area 2002 pertains to one of the workstation terminals 130 and includes a manufacturer-related hardware information 2004 (e.g., device manufacturer name, service tag number, device model name, etc.), operating system information 2006, and control system software information 2008.

The device-level detailed information screen 2000 also includes a software update display area 2010 that is provided to display installed software and/or firmware updates. As shown, knowledgebase article identification numbers 2012 and names 2014 associated with the installed software/firmware updates are also displayed. The knowledgebase article numbers 2012 are displayed as hyperlinks to enable users to retrieve a knowledgebase article of interest from the device-level detailed information screen 2000.

The device-level detailed information screen 2000 is also provided with an add-on card information display area 2016 that is used to display information associated with installed hardware cards. In addition, installed server software information is displayed via the device-level detailed information screen 2000 in a server software information display area 2016.

Returning now to FIG. 2, the example hierarchy map 200 includes an example system interfaces screen 2100 that may be accessed by selecting a corresponding hyperlink associated with one of the information tiles 314 in the main menu screen 300 of FIG. 3. The system interfaces screen 2100, which is depicted in detail in FIG. 21, is provided to view, modify, and manage information associated with the I/O busses used to implement the process control systems (e.g., the process control systems 118 and 120 of FIG. 1) within an enterprise.

Figure 22:
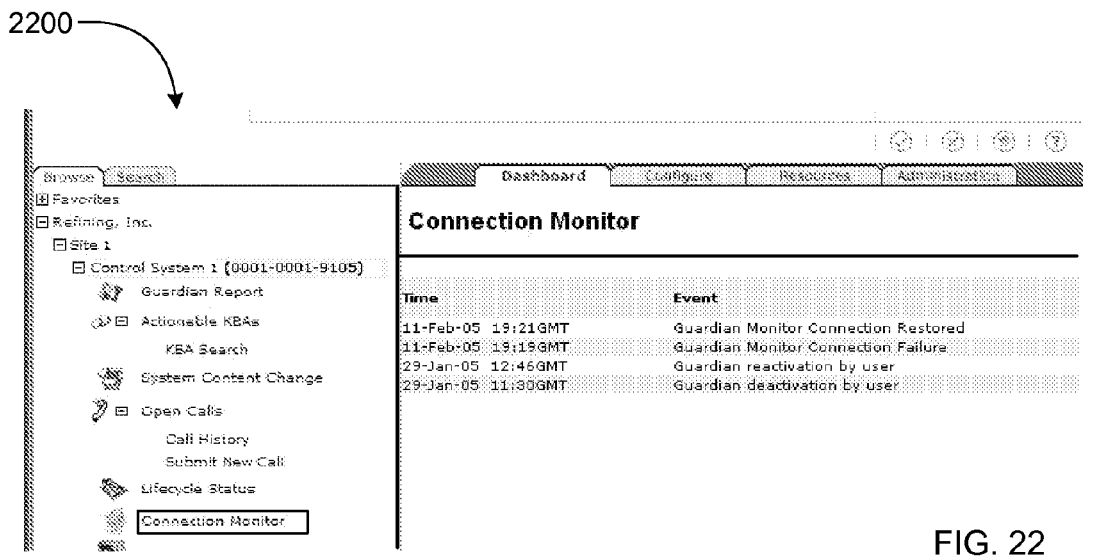
FIG. 22 is a graphical user interface of an example connection monitor screen that may be used to display a plurality of network connection events associated with the example online maintenance system of FIG. 1.

As also shown in FIG. 2, the example hierarchy map 200 includes an example connection monitor screen 2200 that may be accessed by selecting one of the information tiles 314 in the example main menu screen 300 of FIG. 3. The example connection monitor screen 2200, which is shown in detail in FIG. 22, is provided to display information associated with network connection events. The network connection events may be generated by the messenger server 136 of FIG. 1 and communicated to the SMS server 108 for storage and subsequent retrieval. The events may include the dates on which network connections were established, terminated, restored, disabled, enabled, etc. In this manner, a user may analyze the event information to determine whether any corrective or preventative maintenance is needed for any network connections.

Figure 23:
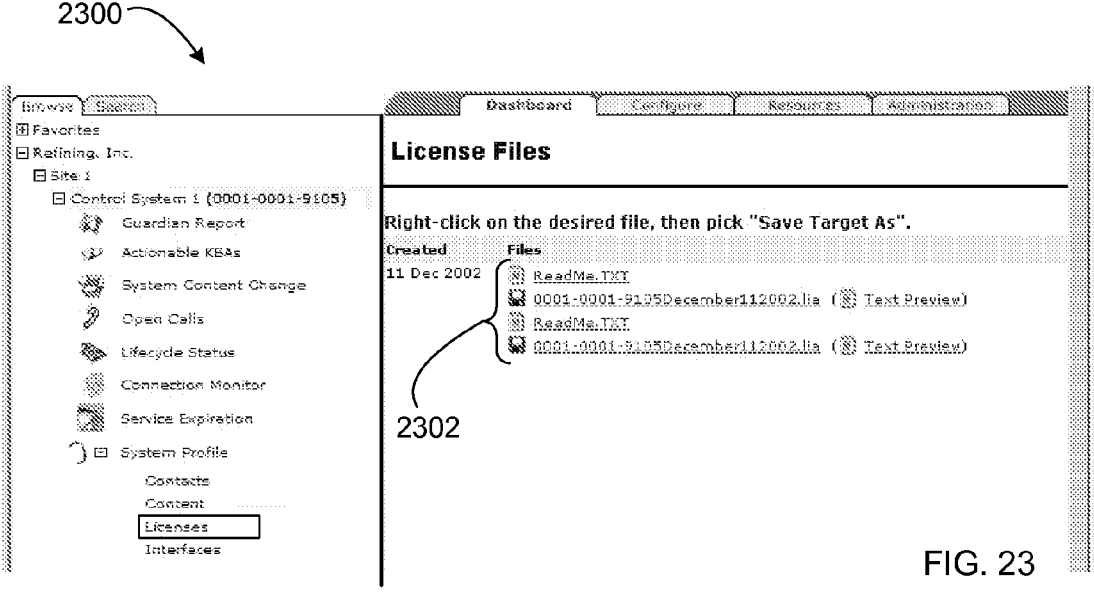
FIG. 23 is a graphical user interface of an example license screen that may be used to display a plurality of licenses corresponding to hardware and/or software components associated with the process control systems of FIG. 1.

Returning to FIG. 2, the example hierarchy map 200 includes an example license files screen 2300 that may be accessed by selecting one of the information tiles 314 in the example main menu screen 300 of FIG. 3. A detailed depiction of the example license files screen 2300 is shown in FIG. 23. In the illustrated example, the example license files screen 2300 is provided to display information pertaining to software and/or hardware licenses associated with software and/or hardware used to implement the process control systems (e.g., the process control systems 118 and 120 of FIG. 1) within an enterprise or any other system (e.g., the messenger server 136) associated with an enterprise. As shown in FIG. 23, the example license files screen 2300 may display hyperlinks 2302 to license documentation including, for example, license agreement text files and license data files, which may be required to enable operation of software and/or hardware.

Figure 24:
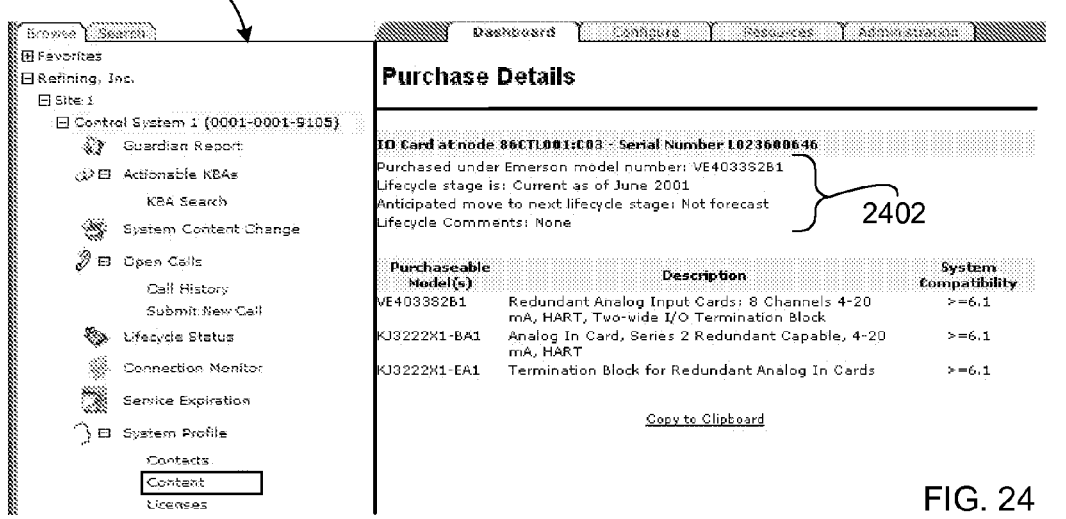
FIG. 24 is a graphical user interface of an example purchase details screen that may be used to display detailed purchase information associated with the purchase of equipment within the process control systems of FIG. 1.
Figure 25:
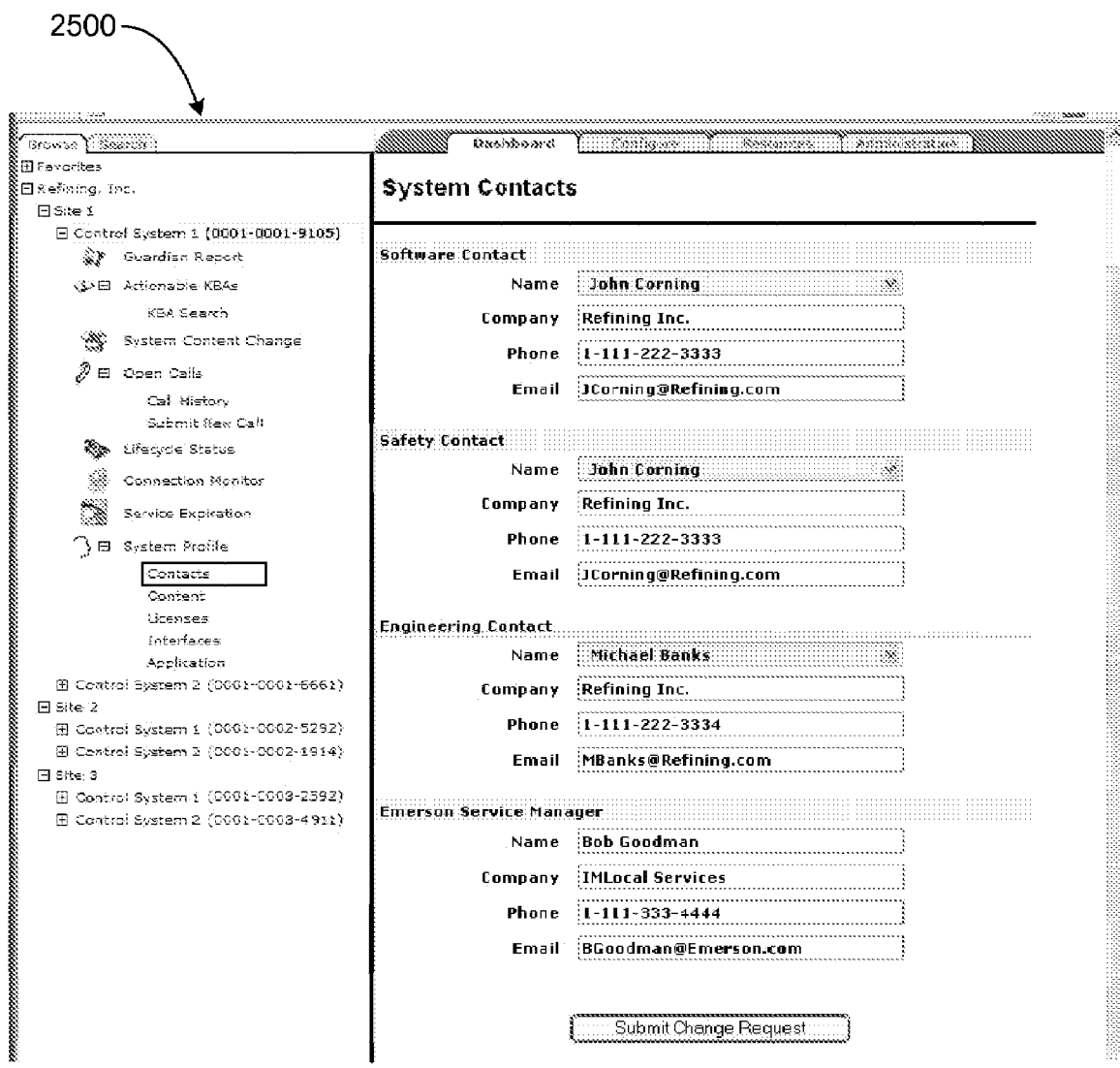
FIG. 25 is a graphical user interface of an example system contacts screen that may be used to display contact information for persons responsible for different portions of the process control systems of FIG. 1.

The example hierarchy map 200 of FIG. 2 also includes an example purchase details screen 2400 that can be accessed by selecting one of the information tiles 314 in the example main menu screen 300 of FIG. 3. The example purchase details screen 2400, which is depicted in detail in FIG. 24, is provided to display information (e.g., model, description, etc.) related to purchases made for any portion (e.g., hardware and/or software) of an enterprise including, for example, process control systems (e.g., the process control systems 118 and 120 of FIG. 1). In addition, as shown in the illustrated example of FIG. 24, the example purchase details screen 2400 displays lifecycle status information 2402.

The example hierarchy map 200 of FIG. 2 also includes an example system contacts screen 2500 that can be accessed by selecting a hyperlink associated with one of the information tiles 314 of the main menu screen 300 of FIG. 3. As shown in the illustrated example of FIG. 25, the example system contacts screen 2500 may be used to view and/or modify contact information for persons responsible for different aspects of a process control system (e.g., the process control systems 118 and 120 of FIG. 1).

Figure 26:
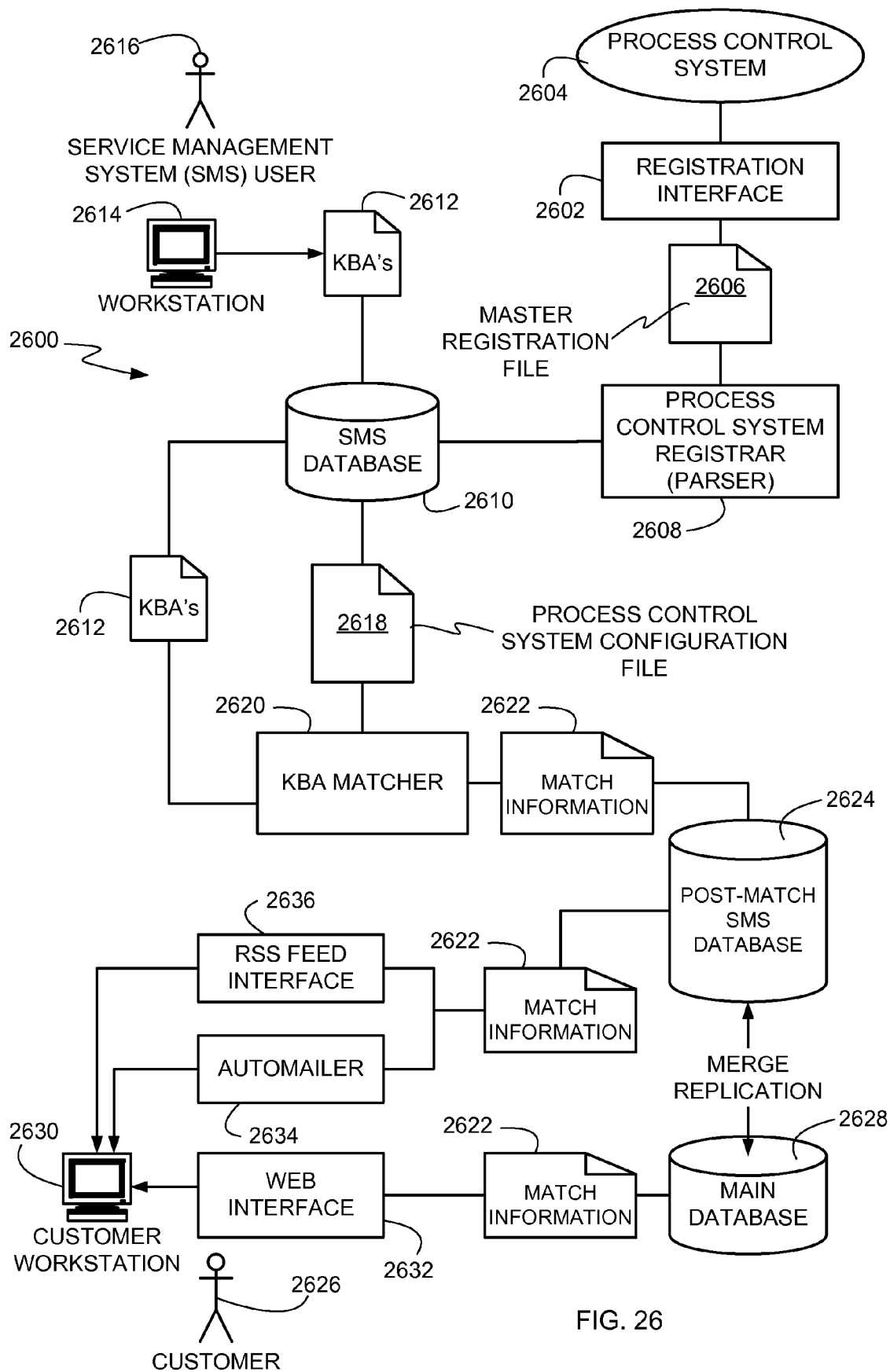
FIG. 26 is an example system that may be used to implement the example systems and methods described herein.

FIG. 26 is an example system 2600 that may be used to implement the example systems and methods described herein. In some of the illustrated examples described below, components or parts of the example system 2600 are described as being implemented using one or more parts of the example online maintenance system 102 described above in connection with FIG. 1. However, the example system 2600 may be implemented in combination with or separate from the example online maintenance system 102. The example system 2600 may be implemented using any desired combination of hardware, firmware, and/or software. In some example implementations, the example system 2600 may be implemented as a single apparatus (e.g., a single apparatus, a device, etc.) or as two or more apparatus, some of which may be communicatively coupled to one another. For example, the one or more apparatus may be implemented using one or more integrated circuits, discrete semiconductor components, or passive electronic components. Additionally or alternatively, some or all of the blocks of the example system 2600, or parts thereof, may be implemented using instructions, code, and/or other software and/or firmware, etc. stored on a machine accessible medium that, when executed by, for example, a processor system (e.g., the example processor system 3210 of FIG. 32), perform the operations represented in the flow diagrams of FIGS. 28-31.

As shown in FIG. 26, the example system 2600 includes a registration interface 2602 that is communicatively coupled to an example process control system 2604 (e.g., the process control systems 118 and 120 of the first site 110 of FIG. 1 and/or the process control systems (not shown) of the second and third sites 112 and 114 of FIG. 1). The example process control system 2604 is substantially similar or identical to the distributed process control systems 118 and 120 of FIG. 1. In the illustrated example, the registration interface 2602 may be implemented using the main server 104 of FIG. 1 and is configured to register the process control system 2604 to use the example online maintenance system 102 of FIG. 1. For example, the registration interface 2602 may receive information (i.e., registration information) associated with the process control system 2604. Registration information may pertain to hardware configurations, software, firmware, operating conditions, life cycle status, maintenance information, or any other information described above in connection with the graphical user interface displays of FIGS. 2-25. The registration information may include, for example, serial numbers, version numbers, model numbers, part numbers, network identifications, and/or any other information described above in connection with the graphical user interface displays of FIGS. 2-25.

The registration interface 2602 may collect registration information from the process control system 2604 during an initial enrollment of the process control system 2604 and/or after the initial enrollment any time the process control system 2604 has any new or revised registration information (e.g., any time the process control system 2604 is updated, upgraded, serviced, changed in operation, etc.) to communicate to the example system 2600. In an example implementation, the registration interface 2602 may automatically, periodically (e.g., daily, weekly, etc.) or aperiodically poll the process control system 2604 to request any updated or new registration information. For example, the registration interface 2602 may automatically communicate with a messenger server (e.g., the messenger server 136 of FIG. 1) associated with the process control system 2604 to obtain new or updated registration and/or configuration information corresponding to the process control system 2604.

Additionally or alternatively, the registration interface 2602 may be manually controlled by an operator (e.g., a system engineer, a user, etc.) to poll the process control system 2604. In any case, the process control system 2604 (e.g., the messenger server 136 of FIG. 1) may automatically respond by communicating any new or updated registration information to the registration interface 2602. In addition, an operator associated with the process control system 2604 may use, for example, a workstation terminal (e.g., the workstation terminal 130 of FIG. 1) to manually cause new or updated registration information to be communicated from the process control system 2604 to the registration interface 2604 in response to requests for information from the registration interface 2604 and/or any time the process control system 2604 has new or updated registration information.

To enable communications between the process control system 2604 and the example system 2600, the process control system 2604 may have client software (not shown) installed thereon (e.g., client software installed on a process control system server or a workstation terminal such as, for example, the workstation terminals 130 and 132 of FIG. 1) that enables the process control system 2604 to receive requests for information from the registration interface 2602 and to communicate registration information to the registration interface 2602.

Although the example system 2600 is shown communicatively coupled to one process control system (e.g., the process control system 2604), the example system 2600 may be communicatively coupled to any number of process control systems. For example, the example system 2600 may be implemented using one or more servers (e.g., the main server 104, the web page server 106, the SMS server 108, the messenger server 136 of FIG. 1) communicatively coupled via the Internet to a plurality of process control systems (e.g., the process control systems 118 and 120 of the first site 110 of FIG. 1 and/or the process control systems (not shown) of the second and third sites 112 and 114 of FIG. 1). In such an example implementation, the registration interface 2602 communicates with the process control systems and receives registration information from all of the process control systems.

The registration interface 2602 generates a master registration file 2606 corresponding to the process control system 2604 based on the registration information received from the process control system 2604. The master registration file 2606 may store the registration information using an extensible markup language ("XML") format, a plain text format, or any other suitable format. The registration interface 2602 generates and maintains a separate master registration file (e.g., the master registration file 2606) for each process control system that the example system 2600 monitors. In an example implementation, the registration interface 2602 may be configured to encrypt the master registration file 2606 to substantially reduce or eliminate data tampering by unauthorized persons or unauthorized network entities.

In an example implementation, the registration interface 2602 also periodically analyzes the master registration file 2606 for data corruption or tampering. If the registration interface 2602 determines that registration information in the master registration file 2606 is corrupted or has been compromised (e.g., tampered with), the registration interface 2602 may store a descriptor associated with the corrupted or compromised data in the master registration file 2606 indicating a data error and the type of error. The descriptor may include a sender identity (e.g., a user name of an operator associated with the process control system 2604), a source identity (e.g., a process control system identification of the process control system 2604), and a date associated with reception of the corrupted or compromised data.

To parse (e.g., filter, separate, categorize, organize, etc.) the registration information stored in the master registration file 2606, the example system 2600 is provided with a process control system registrar 2608. In the illustrated example, the process control system registrar 2608 may be implemented using the main server 104 of FIG. 1 and is configured to read the registration information in the master registration file 2606, parses the registration information, and organizes the information into separate categories. When the registration interface 2602 receives new or updated registration information and/or detects corrupted or compromised data in the master registration file 2606, the registration interface 2602 creates a change record event to indicate new or updated registration information has been received for the master registration file 2606 and communicates the change record event to the process control system registrar 2608.

In the illustrated example, the process control system registrar 2608 reads the registration information from the master registration file 2606 and organizes the registration information into hardware categories, software categories, firmware categories, operating conditions categories, life cycle categories, maintenance categories, or any other categories associated with the information described above in connection with the graphical user interface displays of FIGS. 2-25. For each category the process control system registrar 2608 may further categorize the registration information into subcategories. Example subcategories for a hardware category may include device type, model number, manufacturer part number, etc.

To store the parsed registration information, the example system 2600 is provided with a service management system ("SMS") database 2610 communicatively coupled to the process control system registrar 2608. The SMS database 2610 may be implemented in and/or communicatively coupled to, for example, the SMS server 108 (FIG. 1) and is configured to store SMS data records (not shown) that include the categorized information organized by the process control system registrar 2608. The SMS database 2610 stores data records corresponding to each process control system that is monitored by the example system 2600. In the illustrated example, after the process control system registrar 2608 categorizes the registration information obtained from the master registration file 2606, the process control system registrar 2608 communicates the categorized registration information to the SMS database 2610 to update the SMS data records associated with the process control system 2604.

The registration information stored in the SMS database 2610 may be used to associate components (e.g., devices, hardware, software, etc.) of the process control system 2604 with knowledgebase articles ("KBA's") 2612. The KBA's 2612 are described above in connection with the example actionable KBA summary screen 1000 of FIGS. 2 and 10. An example KBA matching process can use the SMS data records stored in the SMS database 2610 to find ones of the KBA's 2612 relevant to monitored process control systems and/or portions thereof.

In the illustrated example, the KBA's 2612 are provided by a workstation 2614 and stored in the SMS database 2610. The workstation 2614 may be associated with a business entity providing the example system 2600 and operators associated with the example system 2600 (e.g., an SMS user 2616) may provide information to the workstation 2614 to at least some of the KBA's 2612. Additionally or alternatively, the workstation 2614 and or other workstations communicatively coupled to the example system 2600 that provide some of the KBA's 2612 may be associated with device manufacturers (e.g., the device manufacturer 138 of FIG. 1) and/or software developers (e.g., the software developer 140 of FIG. 1) that design and/or manufacture components in the process control system 2604. Of course, KBA's may also be communicated to the workstation 2614 from any other source.

To enable the example system 2600 to match components of the process control system 2604 to relevant ones of the KBA's 2612, the example system 2600 generates a process control system configuration file 2618 based on the registration information stored in the SMS database 2610. For example, the SMS server 108 of FIG. 1 may retrieve information from the SMS database 2610 and generate the process control system configuration file 2618 using the retrieved information. Although only one process control system configuration file (e.g., the process control system configuration file 2618) is shown, the example system 2600 may provide a plurality of process control system configuration files, each corresponding to a different process control system (e.g., the process control system 2604, the process control systems 118 and 120 of the first site 110 of FIG. 1, the process control systems (not shown) of the second and third sites 112 and 114 of FIG. 1, etc.) monitored by the example system 2600.

To match components of the process control system 2604 to relevant ones of the KBA's 2612, the example system 2600 is provided with an example KBA matcher 2620. The example KBA matcher 2620 receives the KBA's 2612 and the process control configuration file 2618. The KBA matcher 2620 compares information (e.g., serial numbers, version numbers, model numbers, part numbers, network identifications, and/or any other information described above in connection with the graphical user interface displays of FIGS. 2-25) stored in the process control system configuration file 2618 with information in the KBA's 2612 to determine which of the KBA's 2612 are applicable or relevant to components in the process control system 2604. In the illustrated example, the KBA matcher 2620 is implemented according to the example KBA matching process described below in connection with flow diagrams depicted in FIGS. 28-30.

The example KBA matcher 2620 provides match information 2622 including the ones of the KBA's 2612 relevant to the process control system 2604 and at least some of the configuration information from the process control system configuration file 2618 to which the relevant ones of the KBA's 2612 pertain. The KBA matcher 2620 may provide the match information 2622 in an XML file, a plain text file, a spreadsheet file (e.g., an .XLS file), or any other suitable file. In the illustrated example, the configuration information provided in the match information 2622 may include, for example, node identifiers (e.g., the node identifiers 1104 of FIG. 11), device types (e.g., the node types displayed in the node type fields 1102 of FIG. 11), model descriptions (e.g., the model descriptions 1106 of FIG. 11), serial numbers (e.g., the serial numbers 1108 of FIG. 11), software revision numbers (e.g., the software revision numbers 1110 of FIG. 11), hardware revision numbers (e.g., the hardware revision numbers 1112 of FIG. 12), and/or any other information that may be of interest to an operator associated with the process control system 2604.

To store the match information 2622, the example system 2600 is provided with a post-match SMS database 2624. The post-match SMS database 2624 may be implemented in and/or communicatively coupled to, for example, the SMS server 108 of FIG. 1.

To enable an operator associated with the process control system 2604 (e.g., a customer user 2626) to retrieve the match information 2622, the information in the post-match SMS database 2624 is replicated in a main database 2628 so that the match information 2622 is stored in the post-matched SMS database 2624 and the main database 2628. In the illustrated example, the main database 2628 may be implemented in and/or communicatively coupled to the main server 104 of FIG. 1.

As shown in FIG. 26, the customer user 2626 may access and/or retrieve the match information 2622 via a customer workstation 2630 using several interfaces. In the illustrated example, the example system 2600 is provided with a web interface 2632 that the customer user 2626 may use to retrieve the match information 2622. For example, the web interface 2632 may generate and serve web pages substantially similar or identical to the example KBA summary screen 1000 and the example actionable KBA detailed information screen 1100 described above in connection with FIGS. 10 and 11. Additionally or alternatively, the web interface 2632 may enable the customer user 2626 to download a file (e.g., an XLS file, an XML file, etc.) including the match information 2622. The web interface 2632 may be implemented using the web page server 106 of FIG. 1.

To deliver the match information 2622 to the customer user 2626 via e-mail, the example system 2600 is provided with an automailer 2634. For example, the automailer 2634 may e-mail an XML file as an attachment to an e-mail account of the customer user 2626. Alternatively, the automailer 2634 may e-mail an embedded screen interface substantially similar or identical to the example KBA summary screen 1000 and the example actionable KBA detailed information screen 1100 described above in connection with FIGS. 10 and 11. The customer user 2626 may then access the match information 2622 via the workstation 2630 or any other e-mail access device. In some example implementations, the automailer 2634 may encrypt the match information 2622 prior to transmitting via an e-mail and/or may encrypt the e-mail used to send the match information 2622. The automailer 2634 may be implemented using an automailer application executed by the main server 104 of FIG. 1.

To deliver the match information 2622 to the customer user 2626 via a really simple syndication feed ("RSS feed"), the example system 2600 is provided with an RSS feed interface 2636. In the illustrated example, the RSS feed interface 2636 formats the match information 2622 into RSS format and transmits the RSS formatted match information to an RSS receiver of the customer user 2626. An RSS receiver may display RSS feed information via any one or more of the graphical user interface screens described above in connection with FIGS. 2-25. For example, an RSS viewing area may be implemented in a navigation pane and/or title pane of the GUI interface screens. In some example implementations, the RSS feed interface 2636 may send via an RSS feed only a notification that new match information is available for retrieval. The customer user 2626 may then respond by accessing the match information 2622 via the web interface 2632.

Figure 27:
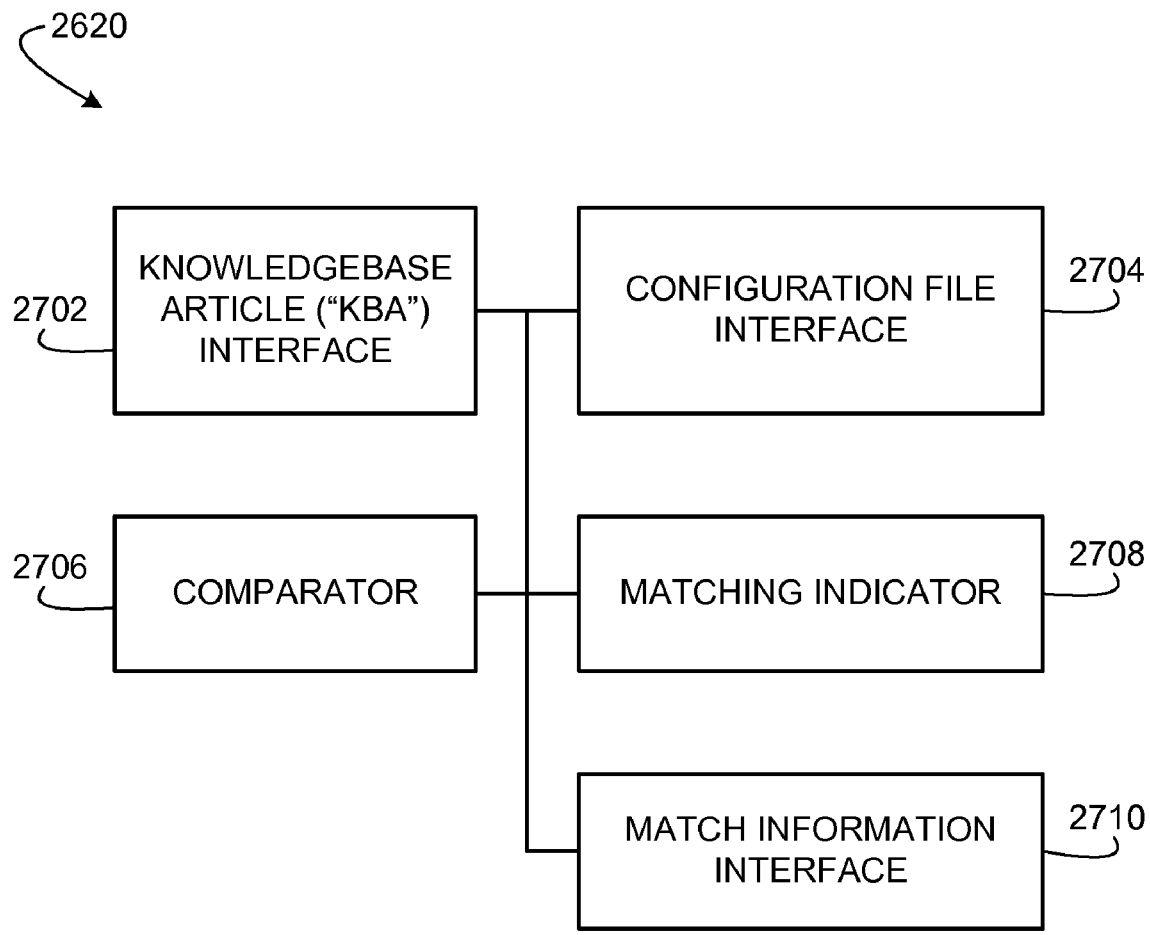
FIG. 27 is a detailed block diagram of an example knowledgebase article ("KBA") system matcher of the example system of FIG. 26.

FIG. 27 is a detailed block diagram of the example KBA matcher 2620 of the example system 2600 of FIG. 26. The example structures shown in FIG. 27 may be implemented using any desired combination of hardware and/or software. For example, one or more integrated circuits, discrete semiconductor components, or passive electronic components may be used. Additionally or alternatively, some or all, or parts thereof, of the example structures of FIG. 27 may be implemented using instructions, code, or other software and/or firmware, etc. stored on a computer-readable medium that, when executed by, for example, a processor system (e.g., the processor system 3210 of FIG. 32), perform the methods described herein. Further, the example methods described below in connection with FIGS. 28-30 describe example operations or processes that may be used to implement some or all of the functions or operations associated with the structures shown in FIG. 27.

The example KBA matcher 2620 is provided with a KBA interface 2702 to obtain the KBA's 2612 from the SMS database 2610 (FIG. 26) and to retrieve information from the KBA's 2612. For example, the KBA interface 2702 may retrieve KBA criteria or KBA attributes including equipment serial numbers, part numbers, software version numbers, software license information, device descriptions, hardware version numbers, device redundancy information (e.g., whether a primary device is associated with a redundant device to assume primary device responsibilities in case of primary device failure), device driver information, software service pack information, device shipment date information, etc. The KBA criteria may be any criteria, attribute, or information that may be used to match a KBA with a process control system and/or nodes (e.g., the nodes 126*a-c* and 128*a-b* of FIG. 1) within a process control system. Example KBA criteria are shown in FIG. 11 and include the node types displayed in the node type fields 1102 to which ones of the KBA's 2612 apply, the node identifiers displayed in the node identifier fields 1104, the model descriptions of field devices displayed in the model description fields 1106, the serial numbers of field devices displayed in the serial number fields 1108, and the software and hardware revision numbers associated with the field devices displayed in the software and hardware revision number fields 1110 and 1112. Of course, other criteria corresponding to KBA's and process control systems and/or nodes of process control systems may be used.

To retrieve and access the process control system configuration file 2618 of FIG. 26, the KBA matcher 2620 is provided with a configuration file interface 2704. In the illustrated example, the configuration file interface 2704 is configured to communicate with the SMS database 2610 (FIG. 26) to retrieve process control system configuration files (e.g., the process control system configuration file 2618 of FIG. 26) of process control systems. For example, the configuration file interface 2704 may communicate process control system identification information to the SMS database 2610 and the SMS database 2610 may respond by communicating a process control system configuration file to the configuration file interface 2704 of the identified process control system. In the illustrated example, the configuration file interface 2704 is also configured to retrieve information (e.g., field device criteria or attributes) from process control system configuration files (e.g., the process control system configuration file 2618).

To compare KBA criteria retrieved from the KBA's 2612 with process control system criteria or attributes retrieved from the process control system configuration file 2618, the KBA matcher 2620 is provided with a comparator 2706. In addition, the comparator 2706 is configured to compare KBA criteria and/or process control system criteria with other values such as, for example, null values or any other values.

To generate information indicative of whether the comparator 2706 has found a match, the KBA matcher 2620 is provided with a matching indicator 2708. In the illustrated example, when the comparator 2706 finds a match between a KBA criterion value and a process control system criterion value or between any other values (e.g., a KBA criterion value and a null value), the comparator 2706 communicates a signal or information to the matching indicator 2708 indicating the match was found. The matching indicator 2708 then generates information indicating the match. For example, the matching indicator 2708 may store the matching information in the match information 2622 (FIG. 26). In an example implementation, the matching information may include a KBA identification value and an identification value of a matching field device, workstation, etc. or a process control system. Additionally or alternatively, the matching information may include a KBA criterion value and a matching process control system criterion value. In another example implementation, the match information 2622 may include a listing of field devices, workstations, etc. of a process control system and the matching indicator 2708 may store a flag or bit value corresponding to particular field devices, workstations, etc. of the process control system that match one or more KBA criteria. To communicate the match information 2622 to the post-match SMS database 2624 (FIG. 26), the KBA matcher 2620 is provided with a match information interface 2710.

Figure 28:
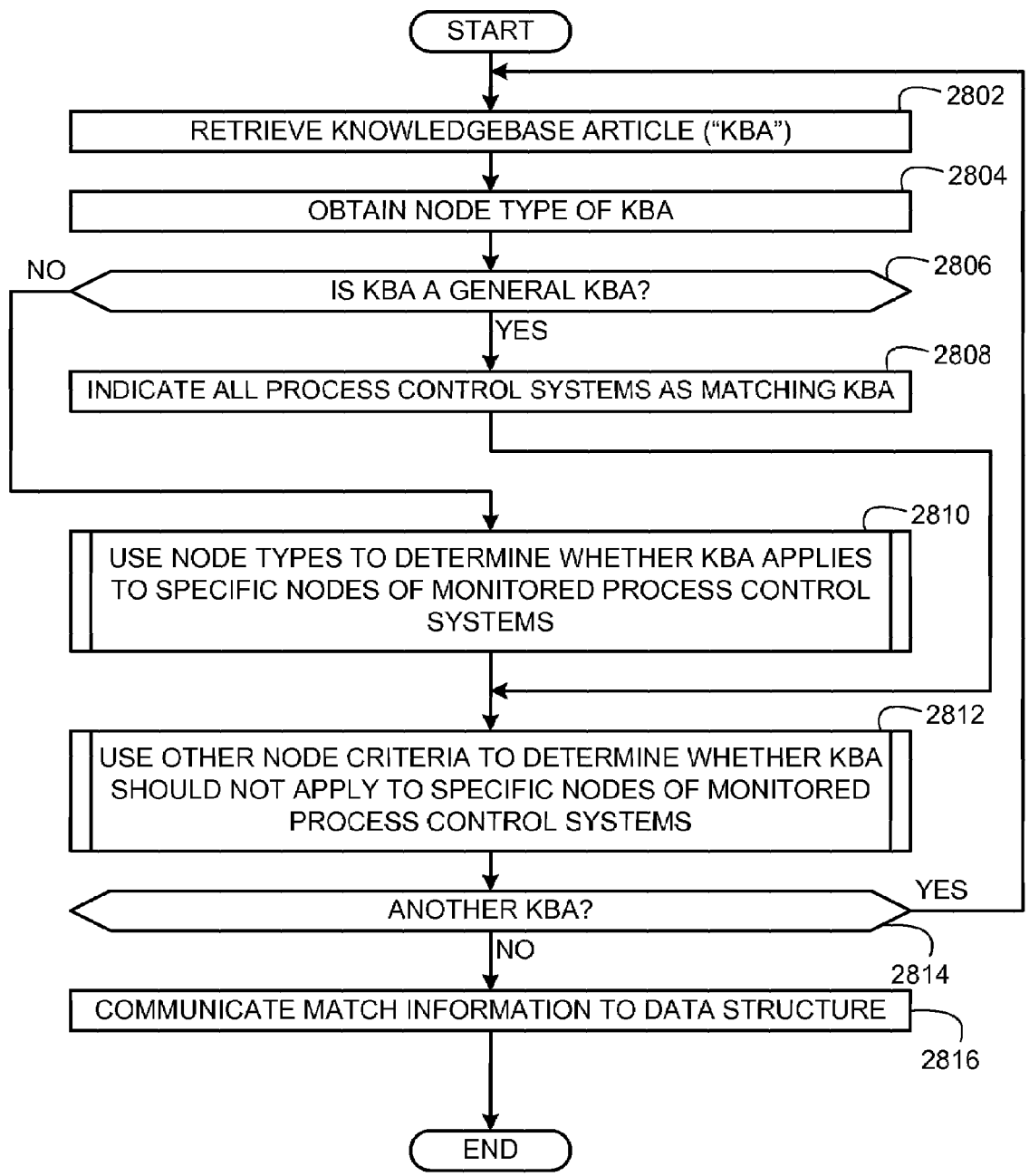
FIG. 28 depicts a flow diagram of an example method that may be used to match KBA's to process control systems.
Figure 29:
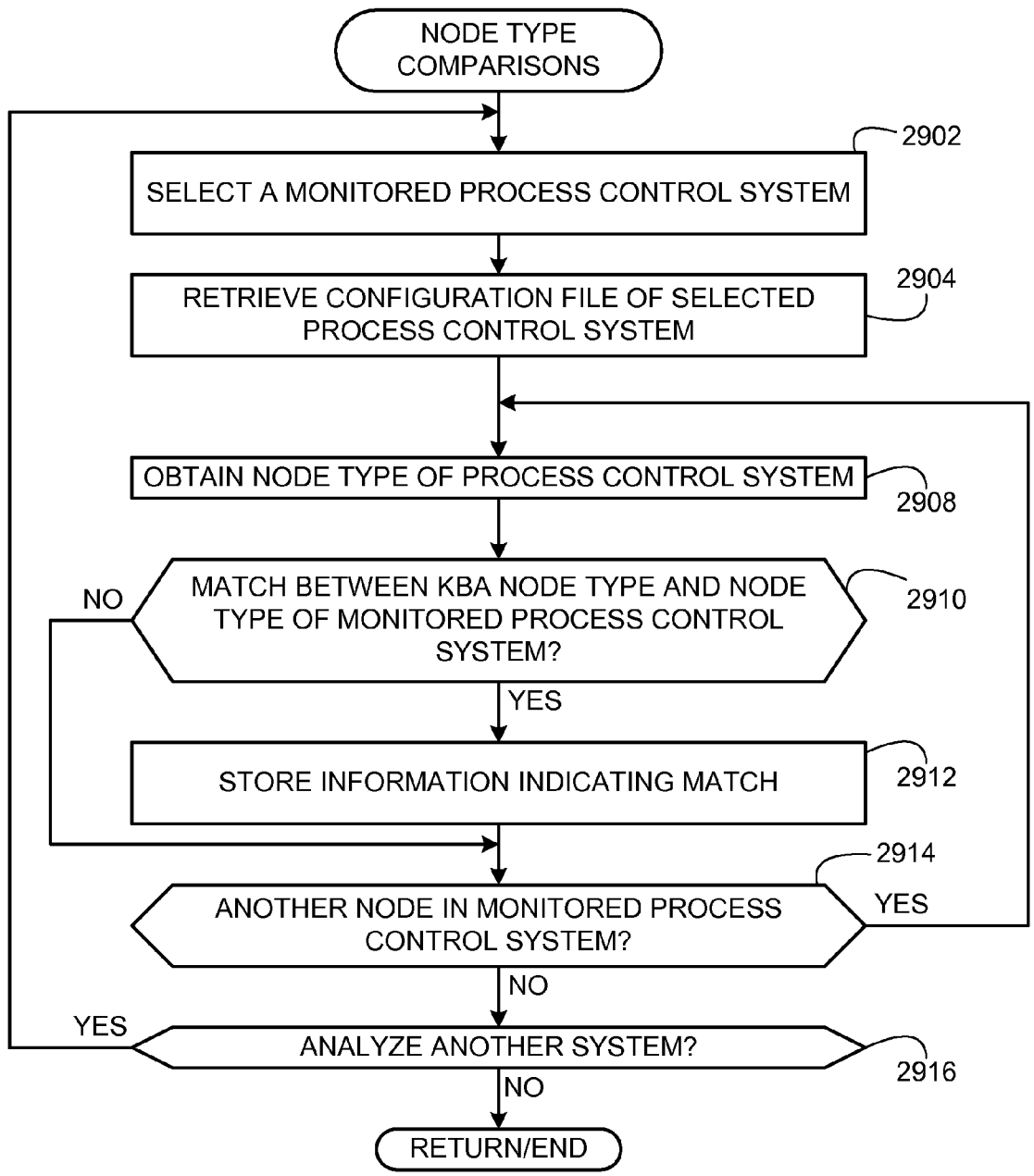
FIG. 29 depicts a flow diagram of an example method that may be used to compare node types of KBA's with node types of process control systems to implement the example method of FIG. 28.
Figure 30:
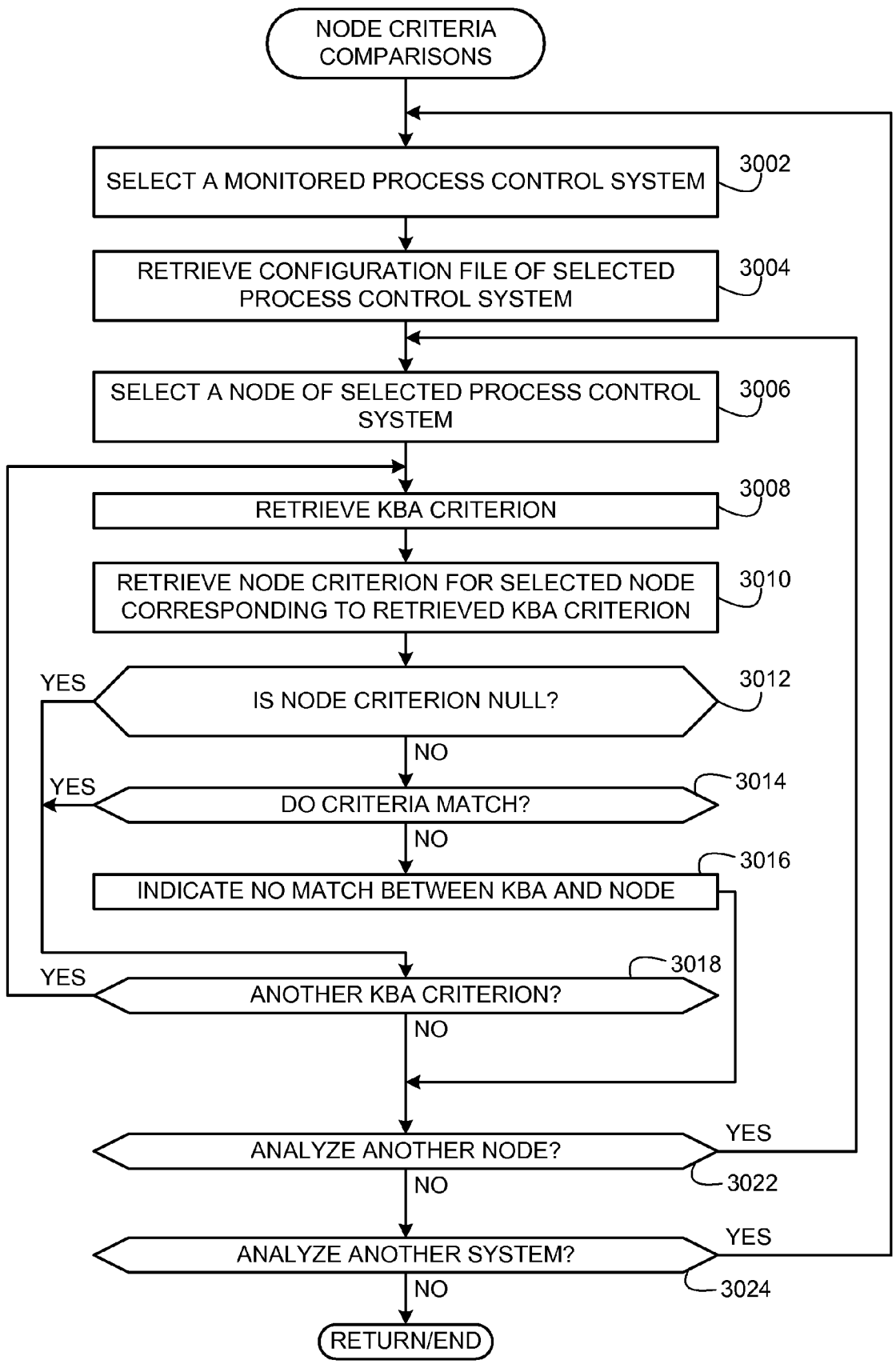
FIG. 30 depicts a flow diagram of an example method that may be used to compare node criteria of KBA's with node criteria of process control systems to implement the example method of FIG. 28.

FIGS. 28-30 depict flow diagrams of example methods that may be used to match knowledgebase articles ("KBA's") (e.g., the KBA's 2612 of FIG. 26) to process control systems (e.g., the process control system 2604, the process control systems 118 and 120 of the first site 110 of FIG. 1, the process control systems (not shown) of the second and third sites 112 and 114 of FIG. 1, etc.), parts of process control systems (e.g., the nodes 126a-c and 128a-b of FIG. 1), or portions of process control systems (e.g., subsystems). In an example implementation, the flow diagrams of FIGS. 28-30 are representative of example machine readable and executable instructions for implementing the example KBA matcher 2620 of FIGS. 26 and 27. In the example implementation, the machine readable instructions comprise a program for execution by a processor such as the processor 3212 shown in the example processor system 3210 of FIG. 32. The program may be embodied in software stored on a tangible medium such as a CD-ROM, a floppy disk, a hard drive, a digital versatile disk ("DVD"), or a memory associated with the processor 3212 and/or embodied in firmware or dedicated hardware in a well-known manner. For example, the KBA matcher 2620 (FIGS. 26 and 27) or one or more of the KBA interface 2702, the configuration file interface 2704, the comparator 2706, the matching indicator 2708, and the match information interface 2710 of FIG. 27 could be implemented using software, hardware, and/or firmware. Further, although the example program is described with reference to the flowcharts illustrated in FIGS. 28-30, persons of ordinary skill in the art will readily appreciate that many other methods of implementing the KBA matcher 2620 may alternatively be used. For example, the order of execution of the blocks may be changed, and/or some of the blocks described may be changed, eliminated, or combined.

The example methods of FIGS. 28-30 are configured to ensure with a relatively high degree of certainty that each KBA will be matched with substantially all monitored process control systems or parts or portions thereof to which that KBA is applicable. In the illustrated examples, the example methods of FIGS. 28-30 are used to compare KBA's with monitored process control systems at a process control system level and at a node level. In this manner, general type KBA's are matched with all or substantially all monitored process control systems to inform operators (e.g., the customer user 2626 of FIG. 26) of the applicable KBA's. The example methods of FIGS. 28 and 29 are used to compare KBA's with node types of monitored process control systems to ensure that each KBA is matched with specific nodes in monitored process control systems having the same node type as that KBA. The example methods of FIGS. 28 and 30 further ensure matching nodes of monitored process control systems with relevant KBA's even if the nodes and the KBA's do not have the same node types. Specifically, the example methods of FIGS. 28 and 30 compare node criteria and KBA criteria (e.g., the node and KBA criteria described above in connection with FIG. 11). For example, if a firmware update alert provided via a KBA is applicable to nodes not having the same node type as described in a node type field (e.g., the node types displayed in the node type fields 1102 of FIG. 11) of the KBA, the example methods of FIGS. 28 and 30 may be used to match the KBA to the applicable nodes based on comparisons of KBA criteria and node criteria. In this manner, devices not having the same node types as a KBA but having software, firmware, hardware, etc. that is the subject of the KBA can be matched to the KBA.

Turning to FIG. 28, initially, the KBA interface 2702 (FIG. 27) retrieves one of the KBA's 2612 of FIG. 26 (block 2802) from, for example, the SMS database 2610 (FIG. 26). The KBA interface 2702 then obtains the node type of the retrieved KBA (block 2804). In the illustrated example, KBA's can be general type KBA's that are related to a process control system generally or KBA's can be specific type KBA's that are related to portions (e.g., subsystems) of a process control system or specific parts (e.g., field devices, workstations, controllers, etc.) of a process control system such as, for example, specific ones of the nodes 126a-c and 128a-b of FIG. 1.

The KBA interface 2702 then determines whether the retrieved KBA is a general type KBA (block 2806). If the KBA interface 2702 determines that the retrieved KBA is a general type KBA (block 2806), the matching indicator 2708 (FIG. 27) stores information in the match information 2622 (FIG. 26) to indicate that the retrieved KBA applies to all monitored process control systems (block 2808) having information in the SMS database 2610 (e.g., all process control systems monitored by the example system 2600). However, if the KBA interface 2702 determines that the retrieved KBA is not a general type KBA (block 2806), the KBA matcher 2620 then uses a node type of the retrieved KBA and node types of monitored process control systems (e.g., process control systems having configuration information stored in the SMS database 2610) to determine whether the KBA applies to specific nodes of monitored process control systems (block 2810). An example method that may be used to implement the operation of block 2810 is described below in connection with FIG. 29.

After comparing node types (block 2810) or after the matching indicator 2708 stores information indicating that the retrieved KBA applies to all monitored process control systems (block 2808), the KBA matcher 2620 uses other node criteria (e.g., the node criteria described above in connection with FIG. 11) of the retrieved KBA and nodes in the monitored process control systems to determine whether the KBA should not apply to any specific nodes of the monitored process control systems (block 2812). For example, if the operation(s) of block 2810 determine that a KBA applies to a particular node, the KBA status is indicated as matched for that node unless the operation(s) of block 2812 determine that other node criteria associated with that node exist to rule out the applicability of the KBA to the node.

The KBA matcher 2620 then determines whether there is another KBA to be analyzed (block 2814). If there is another KBA in, for example, the SMS database 2610 to be analyzed, control returns to block 2802 and the KBA interface 2702 retrieves the next KBA from the SMS database 2610. Otherwise, the match information interface 2710 communicates the match information 2622 to a data structure (block 2816) such as, for example, the post-match SMS database 2624 (FIG. 26) and the process is ended.

The example flow diagram of FIG. 29 is an example method that may be used to implement the operation of block 2810 of FIG. 28. Specifically, the example method of FIG. 29 is used to compare node types of KBA's with node types of monitored process control systems to determine whether KBA's apply to specific nodes of the monitored process control systems. During operation, the KBA matcher 2620 (FIG. 26) selects a monitored process control system (e.g. one of a plurality of monitored process control systems having configuration information stored in the SMS database 2610 of FIG. 26) (block 2902). In the illustrated example, the KBA matcher 2620 selects the process control system 2604 (FIG. 26).

The configuration file interface 2704 then retrieves the process control system configuration file (e.g., the process control system configuration file 2618 of FIG. 26) corresponding to the process control system 2604 (block 2904). In the illustrated example, the configuration file interface 2704 retrieves the process control system configuration file 2618 from the SMS database 2610 by sending a request to the SMS database 2610 including identification information identifying the process control system 2604.

The configuration file interface 2704 then retrieves a node type of a node (e.g., one of the nodes 126*a-c* and 128*a-b* of FIG. 1) within the process control system 2604 (block 2908). For example, the process control system configuration file 2618 may include records corresponding to a plurality of devices or nodes (e.g., the nodes 126*a-c* and 128*a-b* of FIG. 1) in the process control system 2604. The configuration file interface 2704 may access the process control system configuration file 2618 to retrieve the node type of each node in the process control system 2604. In the illustrated example, the configuration file interface 2704 retrieves one node type at a time from the process control system configuration file 2618 at block 2908.

The comparator 2706 then compares the retrieved node type of the process control system 2604 to the KBA node type retrieved at block 2804 of FIG. 28 to determine whether the retrieved node type of the process control system 2604 matches the KBA node type (block 2910). If the comparator 2706 determines that the node type of the process control system 2604 matches the KBA node type (block 2910), the matching indicator 2708 (FIG. 27) stores information in the match information 2622 (FIG. 26) to indicate the match between the node of the process control system 2604 and the KBA (block 2912).

After the matching indicator 2708 indicates the match (block 2912) or if the comparator 2706 determines that the node type of the process control system 2604 does not match the KBA node type (block 2910), the KBA matcher 2620 determines whether the process control system 2604 has another node to compare with the KBA node type (block 2914). If the KBA matcher 2620 determines that the process control system 2604 has another node to be compared, control returns to block 2908 and the configuration file interface 2704 retrieves the node type of the next node of the process control system 2604 to be compared to the KBA node type retrieved at block 2804 of FIG. 28. Otherwise, if the KBA matcher 2620 determines that the process control system 2604 does not have another node to be compared, the KBA matcher 2620 determines whether there is another monitored process control system to be analyzed (block 2916). For example, the configuration file interface 2704 may query the SMS database 2610 to determine whether the SMS database 2610 has configuration information for any other monitored process control systems that the KBA matcher 2620 has not yet compared based on node types with the KBA. If the KBA matcher 2620 determines that there is another monitored process control system to be analyzed, control returns to block 2902 and the KBA matcher 2620 selects another monitored process control system. Otherwise, the process of FIG. 29 is ended and control is returned to a calling process or function such as, for example, the example process depicted in FIG. 28.

The example flow diagram of FIG. 30 is an example method that may be used to implement the operation of block 2812 of FIG. 28. Specifically, the example method of FIG. 30 is used to compare KBA criteria (e.g., the KBA criteria described above in connection with FIG. 11) with node criteria of monitored process control systems to determine whether KBA's should not apply to specific nodes of the monitored process control systems. For example, the example method of FIG. 30 may be used to rule out matches made between a KBA and nodes at block 2810 (FIG. 28) if the nodes have any criteria to indicate that those matches should be ruled out (e.g., the matching status of a KBA to a particular node should be changed to a non-match status).

During operation, the KBA matcher 2620 (FIG. 26) selects a monitored process control system (e.g. one of a plurality of monitored process control systems having configuration information stored in the SMS database 2610 of FIG. 26) (block 3002). In the illustrated example, the KBA matcher 2620 selects the process control system 2604 (FIG. 26). The configuration file interface 2704 then retrieves the process control system configuration file (e.g., the process control system configuration file 2618 of FIG. 26) corresponding to the process control system 2604 (block 3004). In the illustrated example, the configuration file interface 2704 retrieves the process control system configuration file 2618 from the SMS database 2610 by sending a request to the SMS database 2610 including identification information identifying the process control system 2604.

The KBA matcher 2620 selects a node (e.g., one of the nodes 126*a-c* and 128*a-b* of FIG. 1) of the process control system 2604 (block 3006) to compare with criteria of the KBA retrieved at block 2802 of FIG. 28. The KBA interface 2702 then retrieves a KBA criterion (block 3008) from the KBA and the configuration file interface 2704 retrieves a criterion of the selected node (i.e., a node criterion) within the process control system 2604 (block 3010). For example, the process control system configuration file 2618 may include records corresponding to a plurality of devices or nodes (e.g., the nodes 126a-c and 128a-b of FIG. 1) in the process control system 2604 and each record may include one or more node criteria for a corresponding node. The configuration file interface 2704 may access the process control system configuration file 2618 to retrieve node criteria of each node in the process control system 2604. In the illustrated example, the configuration file interface 2704 retrieves one node criterion at a time from the process control system configuration file 2618 at block 3010.

The comparator 2706 then determines whether the node criterion is null (e.g., empty or without a value) (block 3012) by, for example, comparing the retrieved node criterion to a value of null. In this manner, if a node criterion is unknown, unavailable, or incomplete, that node criterion will not be considered in the KBA matching process. If the comparator 2706 determines that the node criterion is not null (block 3012), the comparator 2706 determines whether the node criterion matches the KBA criterion (block 3014) by, for example, comparing the node criterion to the KBA criterion.

If the comparator 2706 determines that the node criterion does not match the KBA criterion (block 3014), the matching indicator 2708 (FIG. 27) indicates a non-match between the selected node of the process control system 2604 and the KBA (block 3016) by, for example, storing information in the KBA match information 2622 (FIG. 26) indicating the match. By ruling out matches between nodes and KBA's based on node and KBA criteria, the KBA matcher 2620 ensures matching nodes in monitored process control systems with relevant KBA's even if the nodes do not have the same node device type or node identification as relevant KBA's. For example, a KBA may be related to a firmware update for an I/O module device type and may be matched to I/O modules based on device type comparisons using the example method depicted in FIG. 29. However, the example method of FIG. 29 may not match the KBA to a field device having a built-in I/O module (i.e., a different device type from that indicated in the KBA) that uses the same firmware because the device type of the field device is not an I/O module device type.

In the illustrated example, to substantially ensure that the KBA will be matched to the I/O module and the field device having a built-in I/O module, the KBA is indicated as a general type KBA (e.g., block 2808 of FIG. 28). In this manner, the I/O module and the field device having a built-in I/O module will be matched to the KBA. To rule out relevancy or matches between specific nodes or device types in the system configuration file 2618 and the KBA, the KBA matcher 2620 uses the example method of FIG. 30 (e.g., block 2812 of FIG. 28) to evaluate other node criteria relative to the KBA criteria. In this case, the example method of FIG. 30 ensures that the KBA matcher 2620 will match the KBA to the field device based on matching criterion of the field device describing an I/O module and criterion of the KBA specifying the I/O module.

If the comparator 2706 determines that the node criterion does not match the KBA criterion (block 3014) or if the comparator determines that the node criterion is null (block 3012), the KBA interface 2702 determines whether the KBA has another KBA criterion to be compared (block 3018). If the KBA interface 2702 determines that the KBA has another KBA criterion to be matched (block 3018), control is passed back to block 3008 and the KBA interface 2702 retrieves another KBA criterion. If the KBA interface 2702 determines that the KBA does not have another KBA criterion to be matched (block 3018) a match made at block 2810 (FIG. 28) between the KBA and the node selected at block 3006 maintains a match status so that a user (e.g., the customer user 2626) is assured of a substantially reliable match of the KBA to the selected node.

If the KBA interface 2702 determines that the KBA does not have another KBA criterion to be matched (block 3018) or after the matching indicator 2708 indicates the match (block 3016), the KBA matcher 2620 determines whether the process control system 2604 has another node to be analyzed (block 3022) based on, for example, the configuration information stored in the process control system configuration file 2618 (FIG. 26). If the KBA matcher 2620 determines that the process control system 2604 has another node to be analyzed (block 3022), control is passed back to block 3006 and the KBA matcher 2620 selects another node of the process control system 2604. Otherwise, if the KBA matcher 2620 determines that the process control system 2604 does not have another node to be analyzed, the KBA matcher 2620 determines whether there is another monitored process control system to be analyzed (block 3024). For example, the configuration file interface 2704 may query the SMS database 2610 to determine whether the SMS database 2610 has configuration information for any other monitored process control systems that the KBA matcher 2620 has not yet analyzed based on criteria information. If the KBA matcher 2620 determines that there is another monitored process control system to be analyzed, control returns to block 3002 and the KBA matcher 2620 selects another monitored process control system. Otherwise, the process of FIG. 30 is ended and control is returned to a calling process or function such as, for example, the example process depicted in FIG. 28.

Figure 31:
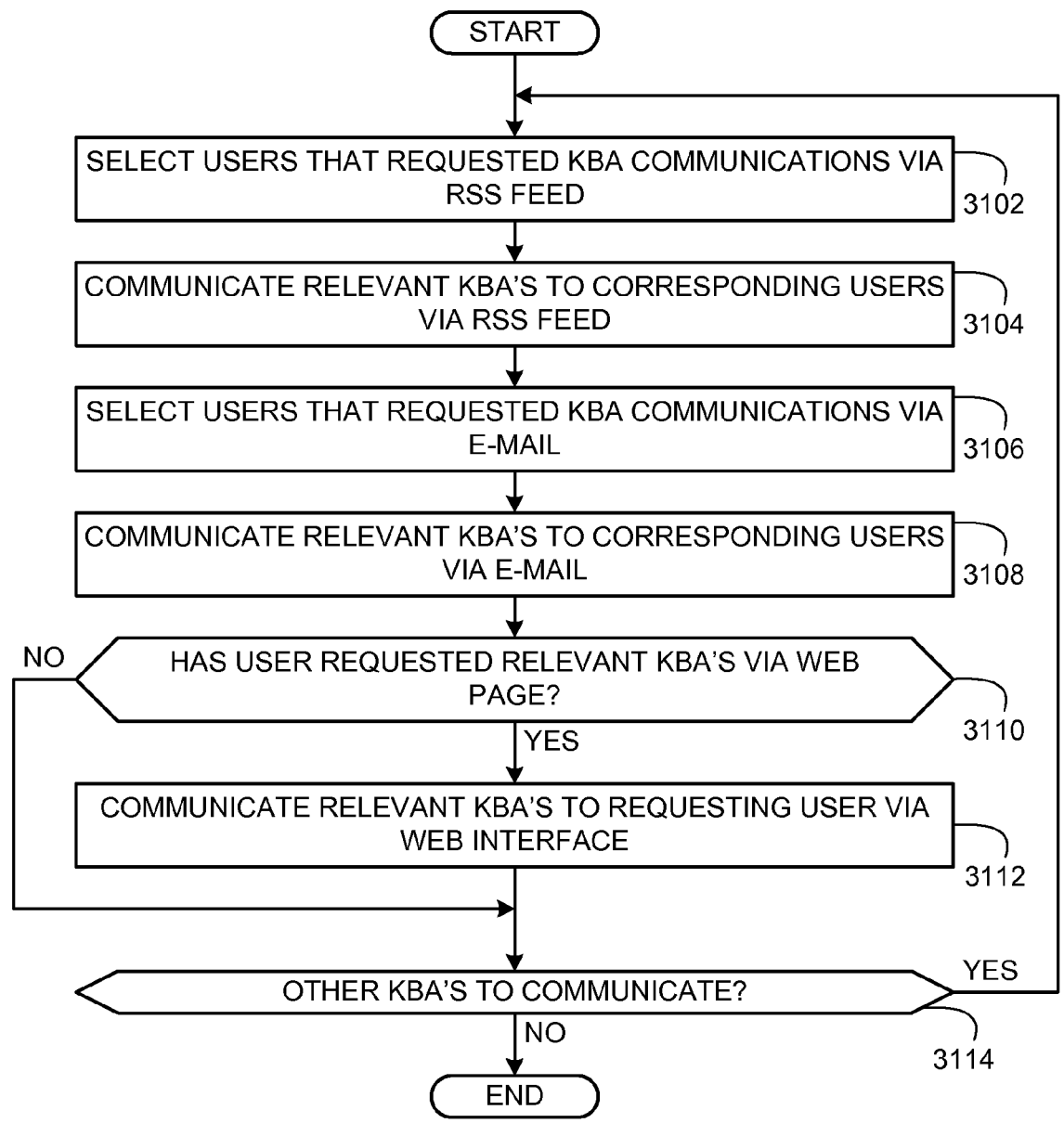
FIG. 31 depicts an example method that may be used to communicate relevant KBA's to process control system operators.

FIG. 31 depicts an example method that may be used to communicate relevant KBA's indicated in the match information 2622 to corresponding process control system operators (e.g., the customer user 2626 of FIG. 26). In the illustrated example, the example method of FIG. 31 is implemented using the RSS interface 2636, the automailer 2634, and/or the web interface 2632 of FIG. 26. Initially, the RSS feed interface 2636 selects users (e.g., the customer user 2626) that have requested KBA communications via RSS feed (block 3102). For example, the RSS feed interface 2636 may access configuration information substantially similar or identical to the configuration information described above in connection with FIG. 4 to determine which users have elected to receive messages via RSS feed. The RSS feed interface 2636 then communicates the relevant KBA's indicated in the post-match SMS database 2624 (FIG. 26) to corresponding user's (block 3104) (e.g., send KBA's to users of process control systems to which the matched KBA's apply) having elected to receive messages via RSS feed.

The automailer 2634 then selects users (e.g., the customer user 2626) that have requested KBA communications via e-mail (block 3106). For example, the automailer 2634 may access configuration information substantially similar or identical to the configuration information described above in connection with FIG. 4 to determine which users have elected to receive messages via e-mail. The automailer 2634 then communicates the relevant KBA's indicated in the post-match SMS database 2624 (FIG. 26) to corresponding user's (block 3108) having elected to receive messages via e-mail.

The web interface 2632 then determines whether any user (e.g., the customer user 2626 of FIG. 26) has requested relevant KBA's via a web page (block 3110) such as, for example, via the main menu screen 300 of FIG. 3, the example report access screen 800 of FIG. 8, the example actionable knowledgebase article ("KBA") summary screen 1000 of FIG. 10, the example actionable KBA detailed information screen 1100 of FIG. 11, or the KBA search screen 1020 of FIG. 12. If the web interface 2632 determines that a user has requested relevant KBA's via a web page (block 3110), the web interface 2632 displays the KBA's indicated in the main database 2628 (FIG. 26) as relevant to the process control system(s) associated with (or selected by) the requesting user (block 3112) via, for example, the example actionable knowledgebase article ("KBA") summary screen 1000 of FIG. 10 or the example actionable KBA detailed information screen 1100 of FIG. 11.

After the web interface 2632 displays the relevant KBA's to the requesting user (block 3112) or if the web interface 2632 determines that no user has requested KBA's via a web page, the RSS feed 2636, the automailer 2634, and/or the web interface 2632 determine whether there are other KBA's to communicate (block 3114). For example, the RSS feed interface 2636 and the automailer 2634 may query the post-match SMS database 2624 and the web interface 2632 may query the main database 2628 to determine whether any other KBA's (e.g., new or updated KBA's) are available to communicate to users. If the RSS feed 2636, the automailer 2634, and/or the web interface 2632 determine that there are other KBA's to communicate, control is passed back to block 3102. Otherwise the process is ended.

Figure 32:
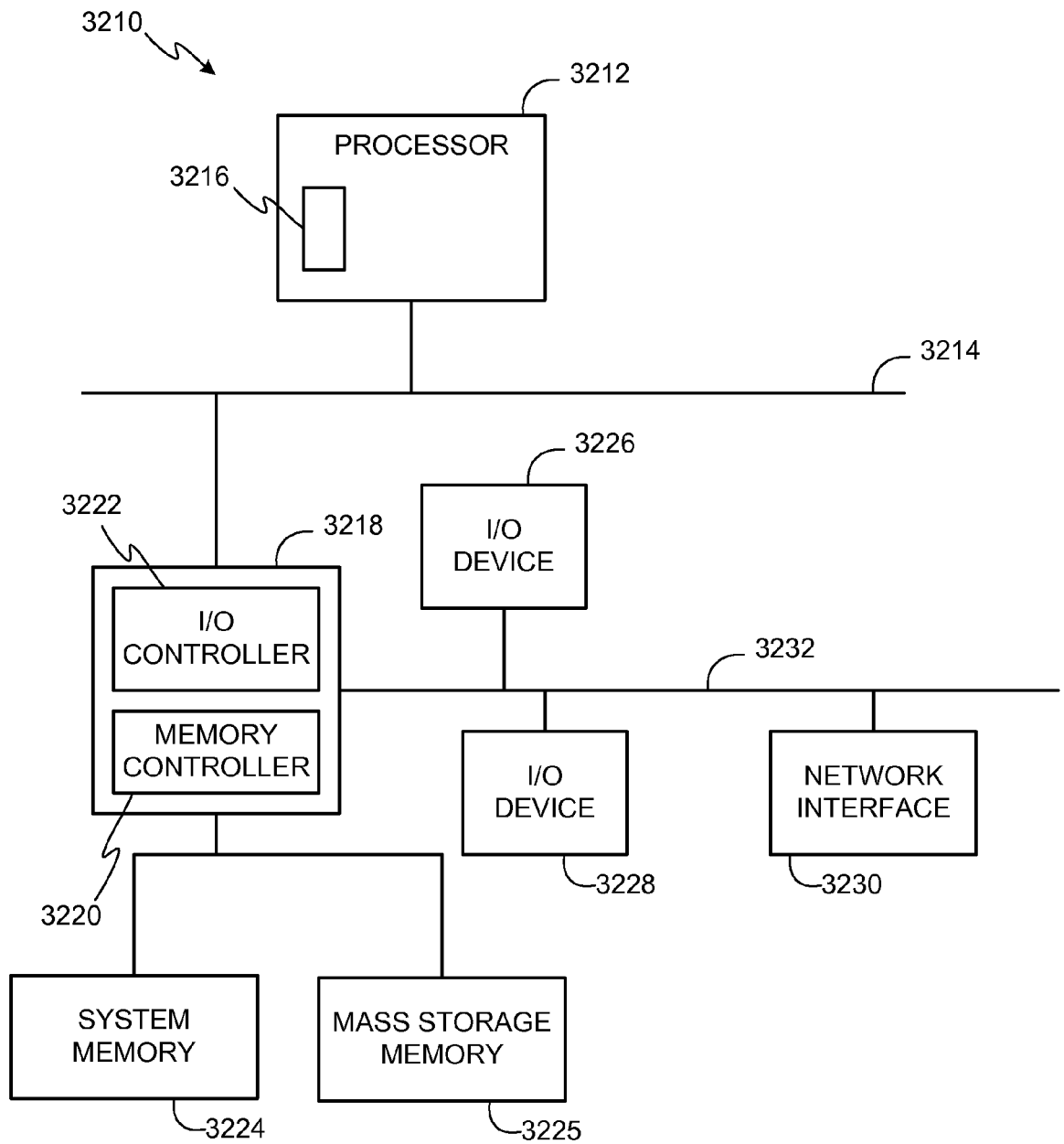
FIG. 32 is a block diagram of an example processor system that may be used to implement the example systems and methods described herein.

FIG. 32 is a block diagram of an example processor system that may be used to implement the example apparatus, methods, and articles of manufacture described herein. As shown in FIG. 32, the processor system 3210 includes a processor 3212 that is coupled to an interconnection bus 3214. The processor 3212 includes a register set or register space 3216, which is depicted in FIG. 32 as being entirely on-chip, but which could alternatively be located entirely or partially off-chip and directly coupled to the processor 3212 via dedicated electrical connections and/or via the interconnection bus 3214. The processor 3212 may be any suitable processor, processing unit or microprocessor. Although not shown in FIG. 32, the system 3210 may be a multi-processor system and, thus, may include one or more additional processors that are identical or similar to the processor 3212 and that are communicatively coupled to the interconnection bus 3214.

The processor 3212 of FIG. 32 is coupled to a chipset 3218, which includes a memory controller 3220 and an input/output ("I/O") controller 3222. As is well known, a chipset typically provides I/O and memory management functions as well as a plurality of general purpose and/or special purpose registers, timers, etc. that are accessible or used by one or more processors coupled to the chipset 3218. The memory controller 3220 performs functions that enable the processor 3212 (or processors if there are multiple processors) to access a system memory 3224 and a mass storage memory 3225.

The system memory 3224 may include any desired type of volatile and/or non-volatile memory such as, for example, static random access memory ("SRAM"), dynamic random access memory ("DRAM"), flash memory, read-only memory ("ROM"), etc. The mass storage memory 3225 may include any desired type of mass storage device including hard disk drives, optical drives, tape storage devices, etc.

The I/O controller 3222 performs functions that enable the processor 3212 to communicate with peripheral input/output ("I/O") devices 3226 and 3228 and a network interface 3230 via an I/O bus 3232. The I/O devices 3226 and 3228 may be any desired type of I/O device such as, for example, a keyboard, a video display or monitor, a mouse, etc. The network interface 3230 may be, for example, an Ethernet device, an asynchronous transfer mode ("ATM") device, an 802.11 device, a DSL modem, a cable modem, a cellular modem, etc. that enables the processor system 3210 to communicate with another processor system.

While the memory controller 3220 and the I/O controller 3222 are depicted in FIG. 32 as separate functional blocks within the chipset 3218, the functions performed by these blocks may be integrated within a single semiconductor circuit or may be implemented using two or more separate integrated circuits.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method for determining whether information is associated with a process control system, comprising:

registering a process control system with a server at which a plurality of other process control systems are registered, the process control system located at a first plant site geographically separate from other plant sites of the plurality of other process control systems;

monitoring, via the server, the process control system and the plurality of other process control systems to facilitate maintaining the process control systems;

retrieving first information from a database in communication with the server based on the monitoring of the process control systems, the database configured to store general type information pertaining to general operations of the process control systems and specific type information pertaining to operations of particular process control system components;

determining whether the first information is associated with general process control system operations, the first information being associated with the general process control system operations when the first information is identified as pertaining to a plurality of the process control system components of different device types based on matches between at least one criterion in the first information and criteria associated with the plurality of the process control system components;

when the first information is not associated with the general process control system operations, determining whether the first information is associated with a particular component of the process control system;

if the first information is associated with the particular component of the process control system, identifying the particular component of the process control system based on a component identifier located in the first information; and communicating the first information to a user, the first information including an action category selected from a group comprising a required action category and an advisement category, wherein the required action category indicates that action must be taken at some point and the advisement category indicates information associated with improving system performance.

2. A method as defined in claim 1, wherein the first information includes a knowledge base article ("KBA") submitted to the database by an end user of one of the plurality of other process control systems.

3. A method as defined in claim 1, wherein the first information includes technical information to help an operator of the process control system identify issues related to the process control system or related to devices of the process control system.

4. A method as defined in claim 3, wherein the technical information includes notifications of at least one of operating errors or maintenance procedures.

5. A method as defined in claim 1, wherein the particular component includes a field device communicatively coupled to and remotely located from a controller of the process control system, and wherein monitoring the process control system comprises monitoring a status of the field device.

6. A method as defined in claim 1, wherein determining whether the first information is associated with the particular component of the process control system comprises comparing a device type described in the first information with a device type of the particular component, the device type of the particular component being registered in the server during an initial enrollment of the process control system with the server.

7. A method as defined in claim 1, wherein communicating the first information to the user comprises communicating the first information via at least one of a really simple syndication ("RSS") feed, an electronic mail, or a web page.

8. A method as defined in claim 1, wherein communicating the first information to the user comprises communicating the first information based on the user being associated with a job responsibility pertaining to the first information.

9. An apparatus for determining whether information is associated with a process control system, comprising:
a server to register a process control system and a plurality of other process control systems to facilitate maintaining the process control systems, the process control system located at a first plant site geographically separate from other plant sites of the plurality of other process control systems;
an interface in communication with the server to retrieve first information from a database in communication with the server based on monitoring of the process control systems, the database configured to store general type information pertaining to general operations of the process control systems and specific type information pertaining to operations of particular process control system components;
a comparator to:
determine whether the first information is associated with general process control system operations, the first information being associated with the general process control system operations when the first information is identified as pertaining to a plurality of the process control system components of different device types based on matches between at least one criterion in the first information and criteria associated with the plurality of the process control system components;
when the first information is not associated with the general process control system operations, determine whether the first information is associated with a particular component of the process control system; and
if the first information is associated with the particular component of the process control system, identify the particular component of the process control system based on a component identifier located in the first information; and
a communication interface to communicate the first information to a user, the first information including an action category selected from a group comprising a required action category and an advisement category, wherein the required action category indicates that action must be taken at some point and the advisement category indicates information associated with improving system performance.

10. An apparatus as defined in claim 9, wherein the first information includes a knowledge base article ("KBA") submitted to the database by an end user of one of the plurality of other process control systems.

11. An apparatus as defined in claim 9, wherein the first information includes technical information to help an operator of the process control system identify issues related to the process control system or related to devices of the process control system.

12. An apparatus as defined in claim 11, wherein the technical information includes notifications of at least one of operating errors or maintenance procedures.

13. An apparatus as defined in claim 9, wherein the particular component includes a field device communicatively coupled to and remotely located from a controller of the process control system, and wherein monitoring the process control system comprises monitoring a status of the field device.

14. An apparatus as defined in claim 9, wherein the comparator is to determine whether the first information is associated with the particular component of the process control system by comparing a device type described in the first information with a device type of the particular component, the device type of the particular component being registered in the server during an initial enrollment of the process control system with the server.

15. An apparatus as defined in claim 9, wherein the communication interface is one of a really simple syndication ("RSS") interface, an electronic mail interface, or a web page interface.

16. An apparatus as defined in claim 9, wherein the communication interface is to communicate the first information based on of the user being associated with a job responsibility pertaining to the first information.

17. A machine accessible medium having instructions stored thereon that, when executed, cause a machine to:
register a process control system with a server at which a plurality of other process control systems are registered, the process control system located at a first plant site geographically separate from other plant sites of the plurality of other process control systems
monitor, via the server, the process control system and the plurality of other process control systems to facilitate maintaining the process control systems;
retrieve first information from a database in communication with the server based on the monitoring of the process control systems, the database configured to store general type information pertaining to general operations of the process control systems and specific type information pertaining to operations of particular process control system components;
determine whether the first information is associated with general process control system operations, the first information being associated with the general process control system operations when the first information is identified as pertaining to a plurality of the process control system components of different device types based on matches between at least one criterion in the first information and criteria associated with the plurality of the process control system components;
when the first information is not associated with the general process control system operations, determine whether the first information is associated with a particular component of the process control system;

if the first information is associated with the particular component of the process control system, identify the particular component of the process control system based on a component identifier located in the first information; and communicate the first information to a user, the first information including an action category selected from a group comprising a required action category, and an advisement category, wherein the required action category indicates that action must be taken at some point and the advisement category indicates information associated with improving system performance.

18. The machine accessible medium as defined in claim 17, wherein the first information includes a knowledge base article ("KBA") submitted to the database by an end user of one of the plurality of other process control systems.

19. The machine accessible medium as defined in claim 17, wherein the first information includes technical information to help an operator of the process control system identify issues related to the process control system or related to devices of the process control system.

20. The machine accessible medium as defined in claim 19, wherein the technical information includes notifications of at least one of operating errors or maintenance procedures.

21. The machine accessible medium as defined in claim 17, wherein the particular component includes a field device communicatively coupled to and remotely located from a controller of the process control system, and wherein monitoring the process control system comprises monitoring a status of the field device.

22. The machine accessible medium as defined in claim 17 having instructions stored thereon that, when executed, cause the machine to determine whether the first information is associated with the particular component of the process control system by comparing a device type described in the first information with a device type of the particular component, the device type of the particular component being registered in the server during an initial enrollment of the process control system with the server.

23. The machine accessible medium as defined in claim 17 having instructions stored thereon that, when executed, cause the machine to communicate the first information to the user via at least one of a really simple syndication ("RSS") feed, an electronic mail, or a web page.

24. The machine accessible medium as defined in claim 17 having instructions stored thereon that, when executed, cause the machine to communicate the first information to the user based on the user being associated with a job responsibility pertaining to the first information.

25. A method as defined in claim 6, wherein the first information includes at least one criterion indicative of a device serial number, a hardware revision number, or a software revision number, and further comprising, when the device type described in the first information matches the device type of the particular component of the process control system, confirming that the first information should not be indicated as a non-match with the particular component by determining that the at least one criterion indicative of the device serial number from the first information matches a component criterion associated with the particular component.

26. A method as defined in claim 1, further comprising, when the first information is associated with the general process control system operations, storing match information indicating that the first information applies to the process control system and the plurality of other process control systems.

27. A method as defined in claim 1, wherein the process control system and the plurality of other process control systems are in communication with the server via a wide area network.

28. A method as defined in claim 27, wherein the wide area network is the Internet.

29. An apparatus as defined in claim 14, wherein the first information includes at least one criterion indicative of a device serial number, a hardware revision number, or a software revision number, and when the device type described in the first information matches the device type of the particular component of the process control system, the comparator is further to confirm that the first information should not be indicated as a non-match with the particular component by determining that the at least one criterion indicative of the device serial number from the first information matches a component criterion associated with the particular component.

30. An apparatus as defined in claim 9, further comprising a match indicator to store match information indicating that the first information applies to the process control system and the plurality of other process control systems when the first information is associated with the general process control system operations.

31. An apparatus as defined in claim 9, wherein the process control system and the plurality of other process control systems are in communication with the server via a wide area network.

32. An apparatus as defined in claim 31, wherein the wide area network is the Internet.

33. A machine accessible medium as defined in claim 17, wherein the first information includes at least one criterion indicative of a device serial number, a hardware revision number, or a software revision number, and when the device type described in the first information matches the device type of the particular component of the process control system, instructions stored on the machine accessible medium, when executed, cause the machine to confirm that the first information should not be indicated as a non-match with the particular component by determining that the at least one criterion indicative of the device serial number from the first information matches a component criterion associated with the particular component.

34. A machine accessible medium as defined in claim 17 having instructions stored thereon that, when executed, cause the machine to store match information indicating that the first information applies to the process control system and the plurality of other process control systems when the first information is associated with the general process control system operations.

35. A machine accessible medium as defined in claim 17, wherein the process control system and the plurality of other process control systems are in communication with the server via a wide area network.

36. A machine accessible medium as defined in claim 35, wherein the wide area network is the Internet.

* * * * *

UNITED STATES PATENT AND TRADEMARK OFFICE
CERTIFICATE OF CORRECTION

PATENT NO. : 7,698,242 B2
APPLICATION NO. : 11/465036
DATED : April 13, 2010
INVENTOR(S) : Van Camp et al.

It is certified that error appears in the above-identified patent and that said Letters Patent is hereby corrected as shown below:

Column 38, line 37 (Claim 33): replace "claim 17" with --claim 22--

Signed and Sealed this

Twenty-ninth Day of June, 2010

David J. Kappos
*Director of the United States Patent and Trademark Office*